US011310120B1

(12) United States Patent
Matkowsky

(10) Patent No.: US 11,310,120 B1
(45) Date of Patent: Apr. 19, 2022

(54) TECHNIQUES FOR DETECTION AND ANALYSIS OF NETWORK ASSETS UNDER COMMON MANAGEMENT

(71) Applicant: Microsoft Technology Licensing, LLC, Redmond, WA (US)

(72) Inventor: Jonathan Matkowsky, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 15/980,688

(22) Filed: May 15, 2018

Related U.S. Application Data

(60) Provisional application No. 62/506,589, filed on May 15, 2017.

(51) Int. Cl.
  *G06F 3/048* (2013.01)
  *H04L 41/22* (2022.01)
  *G06F 3/04847* (2022.01)

(52) U.S. Cl.
  CPC .......... *H04L 41/22* (2013.01); *G06F 3/04847* (2013.01)

(58) Field of Classification Search
  CPC ....... G06F 15/173; H04L 12/26; H04L 29/12; H04L 29/06
  See application file for complete search history.

(56) References Cited

U.S. PATENT DOCUMENTS

| | | | | |
|---|---|---|---|---|
| 8,499,032 B2* | 7/2013 | Matkowsky | ........... | G06Q 10/00 709/203 |
| 9,154,515 B1* | 10/2015 | Russo | ................. | H04L 63/1433 |
| 2007/0198496 A1* | 8/2007 | Loftus | ................. | G06F 16/3331 |
| 2010/0153354 A1* | 6/2010 | Buccella | ............. | G06F 16/9535 707/706 |
| 2016/0057100 A1* | 2/2016 | Blinn | ...................... | G06F 16/95 709/219 |
| 2016/0112284 A1* | 4/2016 | Pon | ....................... | H04L 43/045 709/224 |
| 2017/0180416 A1* | 6/2017 | Giura | ................... | H04L 63/1458 |

* cited by examiner

*Primary Examiner* — Rashawn N Tillery
(74) *Attorney, Agent, or Firm* — Wade IP Law PLLC

(57) ABSTRACT

Techniques are disclosed of detection and analysis of network-based assets under common management by an entity. Network-based assets that are under common management by an entity may be owned or associated with the entity. Some network assets may appear to be under the common management of an entity, but may be operated by an unauthorized entity. Detecting a relationship between or ownership of network assets for malicious network activity may be a challenge. Specifically, the connection between authorized assets and unauthorized assets may be difficult to identify, especially if assets are masked or changed to evade detection. A network analytic system is disclosed that can process different data from multiple sources (e.g., at least multiple, disparate data sources) to identify relationships between network-based assets.

18 Claims, 31 Drawing Sheets

TECHNIQUES FOR DETECTION AND ANALYSIS OF NETWORK ASSETS UNDER COMMON MANAGEMENT

PRIORITY CLAIM

This application claims benefit under 35 U.S.C. § 119(e) of Provisional Application No. 62/506,589, filed May 15, 2017, the entire contents of which is hereby incorporated by reference as if fully set forth herein.

TECHNICAL FIELD

Embodiments relate generally to threat detection, and, more specifically, to techniques for determining management and control of an entity.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible, as it is difficult to quickly and efficiently compare the large amount of information contained within the large number of websites that may be associated with an entity. These challenges extend to entities, which are faced with the burden of monitoring thousands of web documents accessed through network-based digital assets. The network-based digital assets may be owned or associated with an entity (e.g., a company or network domain). Examples of network-based digital assets may include domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

As the Internet grows in popularity, reliability, and speed, businesses may expose more and more network-based assets to the Internet. For example, a business may expose a mail server to the Internet to provide e-mail services for employees, a content server to serve content (e.g., media files) to customers, a web server to serve web pages to customers, an ad server to serve ads to customers, etc. An entity may have thousands of electronic documents (e.g., documents provided via a website) such that compliance and security of the documents and the entity's network-based assets becomes difficult to manage. As more and more network-based assets are exposed to the Internet, a business may find tracking which assets are exposed to the Internet difficult.

As the number of assets exposed to the Internet continues to grow, it may become difficult to identify network-based assets are rightfully associated with a particular business. Specifically, an entity may face challenges with malicious network activity whereby a malicious entity may utilize network-based assets maliciously as being associated with authorized network-based assets of an entity. Often times, the malicious entity may engage in deceptive practices to manage and operate many network-based assets maliciously as being associated with entity to appear authorized with the entity. The connection between authorized assets and unauthorized assets may be difficult to identify, especially if assets are masked or changed to evade detection.

An analyst may be faced with identifying possible network threats to an asset of a domain, a host, or an IP address of an entity. For example, a network threat can be tied to a relationship between a pair of malicious domains sharing an IP address, which is host to a validly registered domain. Identifying the relationship and more importantly an entity that commonly manages malicious assets may not be discoverable.

BRIEF DESCRIPTION OF THE DRAWINGS

Illustrative embodiments of the present disclosure are described in detail below with reference to the following drawing figures:

FIGS. 4-27 illustrate examples of interfaces according to some embodiments.

FIGS. 28-30 illustrate examples of interfaces according to some embodiments.

DETAILED DESCRIPTION

Figure 1:
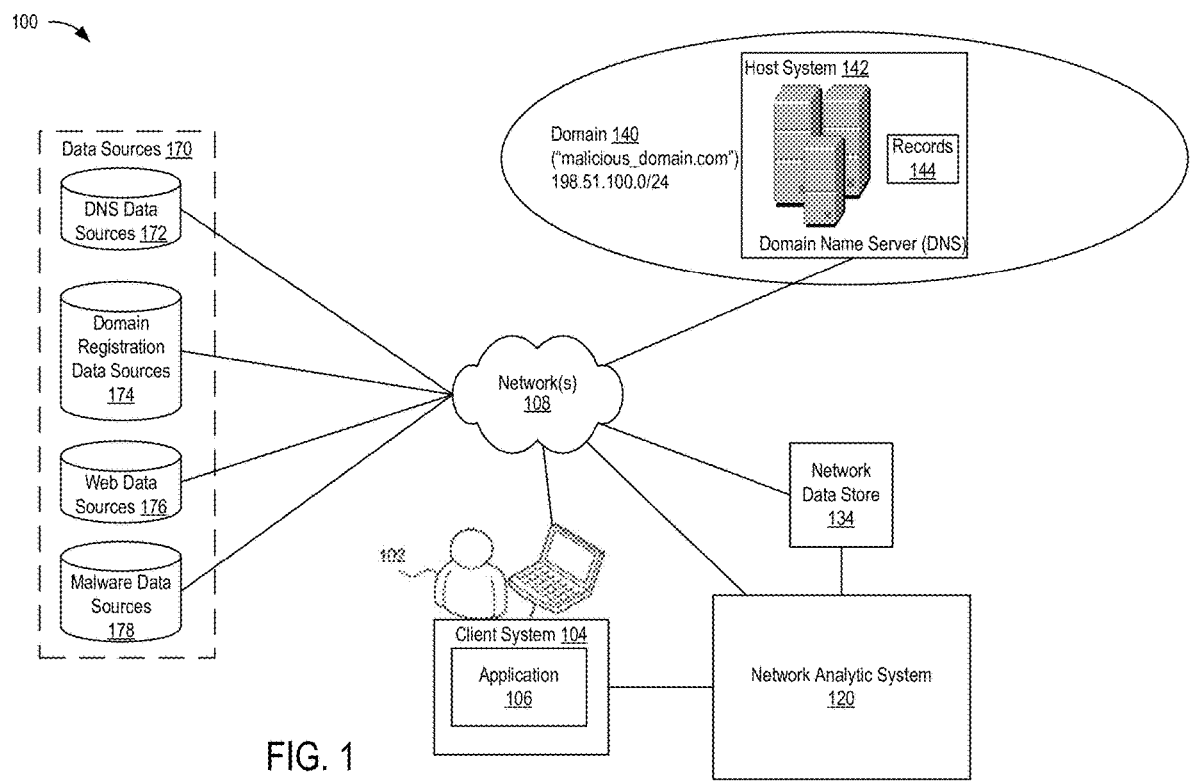
FIG. 1 shows a high-level block diagram illustrating a network analytic system according to an embodiment.

In the following description, for the purposes of explanation, specific details are set forth in order to provide a thorough understanding of embodiments of the disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Some embodiments, such as those disclosed with respect to the figures, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to figures may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of a network analytic system, e.g., network analytic system 120 of FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in the figures can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Embodiments of the present disclosure are directed to for detection and analysis of network-based assets (also referred to herein as "network assets") under common management by an entity. Network assets that are under common management by an entity may be owned or associated with the entity (e.g., a company or network domain). Some network assets may appear to be under the common management of an entity, but may be operated by an unauthorized entity. Detecting a relationship between or ownership of network assets for malicious network activity may be a challenge. Specifically, the connection between authorized assets and unauthorized assets may be difficult to identify, especially if assets are masked or changed to evade detection. Such a connection may be time-consuming, if not impossible, to identify based on how the network assets are configured to evade detection. Further, analysis of disparate data sets from different sources may be difficult to correlate when such data sets may have thousands of records for any given term used as a starting point for analysis.

A network analytic system is disclosed that can process different data from multiple sources (e.g., at least multiple, disparate data sources) to identify relationships between network-based assets. For example, the network analytic system can process data from multiple, disparate data sources, such as web data, domain name system (DNS) data, and WhoIs data. The data may be processed into data having a format defining network assets and the attributes about those network assets. The data may correspond to data from each of the data sources for the network assets. The data may provide no direct indication of unauthorized network activity involving network assets. The data may be generated and updated in real-time based on data from the data sources. The network analytic system can work with subsets of data from multiple data sources (e.g., web data, DNS data, and WhoIs data) to assess visibility into any related Website.

Even after generating the data based on the data sources, the number of unique network assets may be too great to process for identifying specific attributes, which as a combination suggest malicious activity. For users, entities with multiple domain and a several network assets, the entity might not be able to identify a domain that is improperly being associated with a legitimate domain. As disclosed herein, the network analytic system can provide a graphical interface to enable a user to interact with the data from multiple sources to identify relationships within a subset of the original data but as it relates to a different data source. The graphical interface may be interactive to drive processing of network analytic system to determine a relationship between attributes of the network-based assets. This improves the performance of the network analytic system in making it easier to identify potential threat actors. In some embodiments, a candidate set of potential threat actors and/or assets associated with the potential threat actors may be automatically created using the techniques used herein. Thus, the system is enhanced and performance of network analytic system is greatly improved.

The network analytic system may generate data (or data sets) based on processing data from multiple, disparate data sources. The data may be generated to have a single format, which may be different from one or more formats of the data from the data sources. As the data from multiple data sources may be in different formats and/or may include different types of data, the network analytic system may implement techniques to standardize data in a single format. The data may be generated to have data records, each corresponding to a distinct network asset (e.g., a network domain). Using one or more rules, the network analytic system can determine a relationship between data from different data sources to combine the data relevant to each of the network assets identified in the data. The relationship may be determined using one or more rules that indicate the attributes of data as related to network assets. In some embodiments, the network analytic system may implement a deconfliction process to reduce data from multiple data sources into a single format. Deconfliction may include de-duplicating data from multiple data sources and aligning data for different attributes into attributes for data records in a single format. The data in each record may contain all or some of the data from a data source. Each data record may include data about a network asset and one or more attributes for which data is obtained in the data from one or more data sources.

The network analytic system can facilitate a process for analyzing the network data to identify network assets that have a probability of unauthorized activity. The process may be implemented using one or more diagnostic techniques including implementation of one or more algorithms. The algorithms may be defined by one or more rules that assess data records for network assets based on one or more attributes. The rules may be adjusted based results for analysis of data sets to improve accuracy of the algorithms. The processing may include pivoting through data from each of the data sources based on analysis of attributes in data records. The process may be initiated based on specification of a value defining a set of data records. The data records may be analyzed based on the value to exclude data records that have a low priority of unauthorized activity by being associated with an authorized entity. The data records may be excluded or reduced based on multiple attributes defining data that are associated with authorized entities or entities that are not known to be associated with malicious activity. The multiple attributes may be based on data from some data sources, such as a first data source (e.g., a DNS data source) and a second data source (e.g., WhoIs data source). For example, the multiple attributes are a name server and a mail record. The multiple attributes may be selected using a rule-based algorithm that is driven through a graphical interface based on user input. The values for the attributes may be based on historical data and/or knowledge sources. Based on reducing the data records down to a smaller set of data records, the data records may be analyzed based on one or more attributes corresponding to data from a third data source (e.g., web data). The reduced data records may be analyzed to identify one or more data records that may be associated with possible network threats. The reduced data records may be assessed based on one or more additional attributes (e.g., a third attribute), which may be useful to identify inconsistent or unauthorized practice involving network assets as they relate to an authorized entity. The data records associated with a possible threat may be displayed in a graphical interface with an indication as to the attributes identified for a threat.

I. High-Level View of Network Analytic System

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analytic system 120. Network analytic system 120 may be implemented by a computing system. Client system 104 may be operated by one or more users (e.g., user 102), such as a network analyst, whose role it is to assess network activity and to determine possible malicious events related to the network activity.

Client system 104 may include an interface, such as a physical interface, a graphical interface (e.g., a graphical user interface), or a combination thereof. A graphical interface of interface may be generated by client system 104, received from network analytic system 120, or a combination thereof. The graphical interface may be an online grid interface as disclosed herein. The graphical interface may be updated or modified by client system 104 or network analytic system 120 in response to interaction with the interface. Examples of graphical interfaces are disclosed herein, which enable functionality of network analytic system 120. The interface may be provided by network analytic system 120 via network 108 as part of a service (e.g., a cloud service) or application. In some embodiments, client system 104 may provide access to one or more applications 106 ("app"). App 106 may enable a user to access and perform services provided by network analytic system 120.

Client system 104 and network analytic system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Network analytic system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analytic system 120 may run any of operating systems or a variety of additional server applications and/or mid-tier applications, including (hypertext transfer protocol (HTTP) servers, file transfer protocol (FTP) servers, common gateway interface (CGI) servers, Java servers, database servers, and the like. Exemplary database servers include without limitation those commercially available from Microsoft, and the like. In one example, network analytic system 120 may be included in or implemented with a product or service provided by RiskIQ™ Corporation. In some embodiments, network analytic system 120 may be implemented with or included in any of the systems incorporated by reference, such as the systems described in the patent application referenced in this disclosure. In various embodiments, network analytic system 120 may be configured to run one or more services or software applications described in the foregoing disclosure. Network analytic system 120 may correspond to a computing system for performing processing as disclosed herein according to an embodiment of the present disclosure as well as described in U.S. patent application Ser. No. 15/398, 295, filed Jan. 4, 2017, entitled "Techniques for Infrastructure Analysis of Internet-Based Activity," by Dixon et al., the entire contents of which are hereby incorporated by reference for all purposes as if fully set forth herein.

In some embodiments, network analytic system 120 may be implemented as an enterprise computing system or a cloud computing system comprising one or more computers and/or servers that may include those described above. Network analytic system 120 may include several subsystems and/or modules, including some, which may not be shown. The subsystems and/or modules may perform operations disclosed herein. Network analytic system 120 may have more or fewer subsystems and/or modules than shown in the figure, may combine two or more subsystems and/or modules, or may have a different configuration or arrangement of subsystems and/or modules. Subsystems and modules of network analytic system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analytic system 120 may also provide other services or software applications can include non-virtual and virtual environments. In some embodiments, these services may be offered as web-based or cloud services or under Software as a Service (SaaS) model to the users of client system 122. The services offered by network analytic system 120 may include application services. Application services may be provided by network analytic system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analytic system 120, which may be implemented as a cloud infrastructure system. Users can acquire the application services without the need for customers to purchase separate licenses and support. Various different SaaS services may be provided. Users operating client system 122 may in turn utilize one or more applications to interact with network analytic system 120 to utilize the services provided by subsystems and/or modules of network analytic system 120.

Network analytic system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory in network analytic system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

System 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources, such as DNS data sources 172, domain registration data sources 174 (e.g., WhoIs data source), web data sources 176, and malware data sources 178. Some data sources may be obtained from a third party system. Data for some data sources may be obtained based on processing network traffic (e.g., responses and requests). In some embodiments, a data source may be generated based on processing data from a different data source. For example, one data source may be HTTP header data including HTTP re-direct headers. The HTTP header data may be obtained from a third party source. The HTTP header data may be generated based on monitoring network traffic. In some embodiments, web data for web pages may be used to generated HTTP header data for each of those web pages. The HTTP header data may be related or associated with the web data. The data from the data sources may be processed for inclusion in data records for each unique network asset. Other data sources may include those that provide border gateway protocol (BGP) data, zone file data, search engine optimization (SEO) data, and other data related to network activity. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analytic system 120 using network 108.

System 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analytic system 120 using network 108.

System 100 may include one or more network domains (e.g., an Internet domain), such as domain 140. Domain 140 may provide one or more websites. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 may be mapped (e.g., via DNS) to one or more IP addresses. Domain 140 may be communicatively connected to network 108 via an access network.

It should be noted that although not shown in FIG. 1, domain 140 may include one or more sub-domains. Each domain may also be a sub-domain of a larger domain. A domain may map to one or more IP addresses (e.g., via DNS), where each IP address is associated with a host (e.g., a host computing system). A host or host system as referred to herein may include one or more domains, and one or more IP addresses associated with each domain. As used herein, a host may include general purpose computers, as well as other devices, that have an IP address.

System 100 may implement one or more techniques for determining network-based assets that are under common control and management of an entity for network infrastructure analysis. The techniques may be useful for tracking and analysis of network infrastructure for network-based digital assets for an entity. Such assets may be owned or associated with an entity (e.g., a company or network domain). Examples of network-based digital assets include, without restriction, domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

II. Processes for Determining Control and Management of Network Assets

Figure 2A:
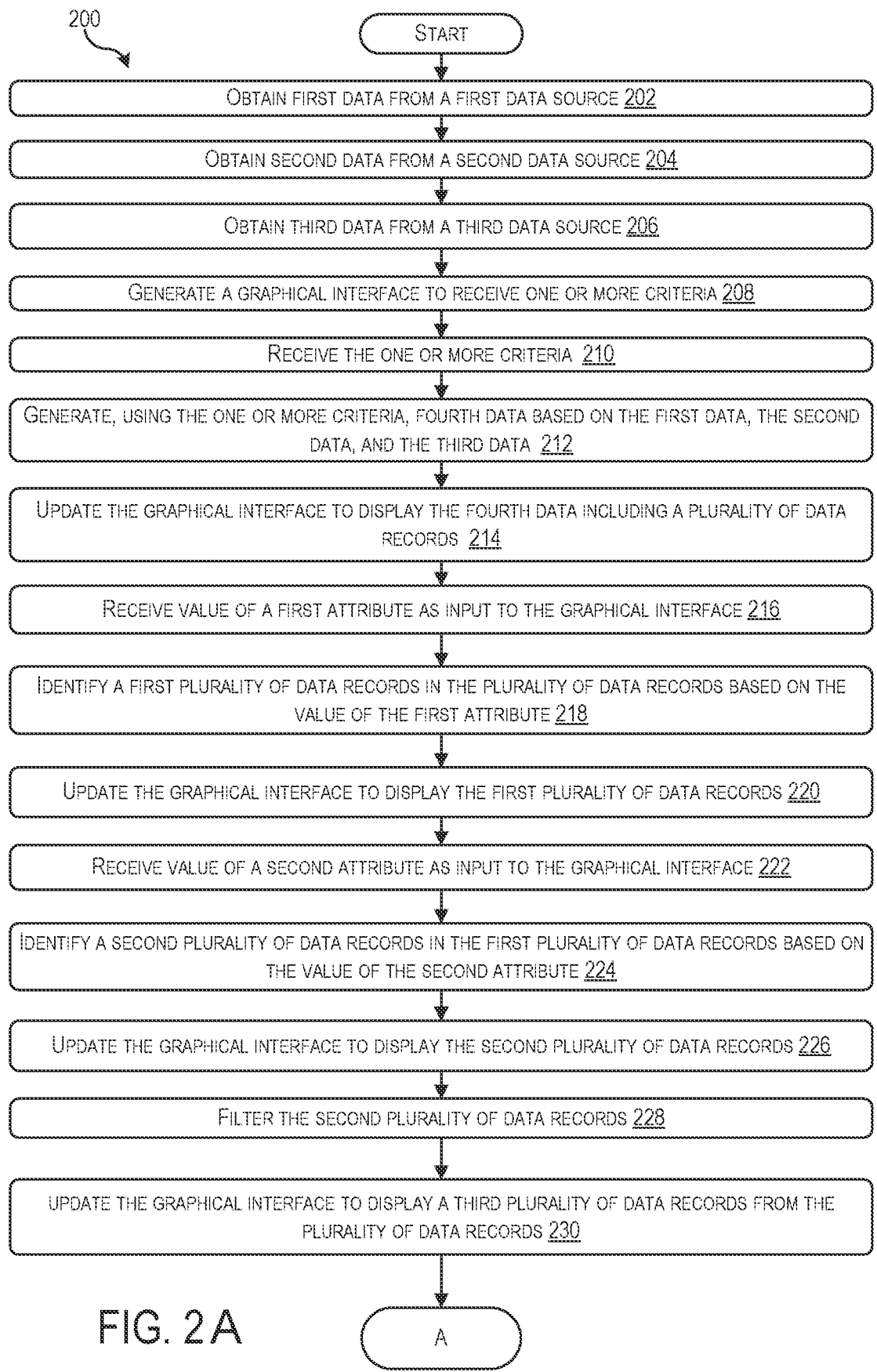
FIGS. 2A-2B show a flowchart of a process assessing network assets under common management of an entity according to some embodiments.
Figure 2B:
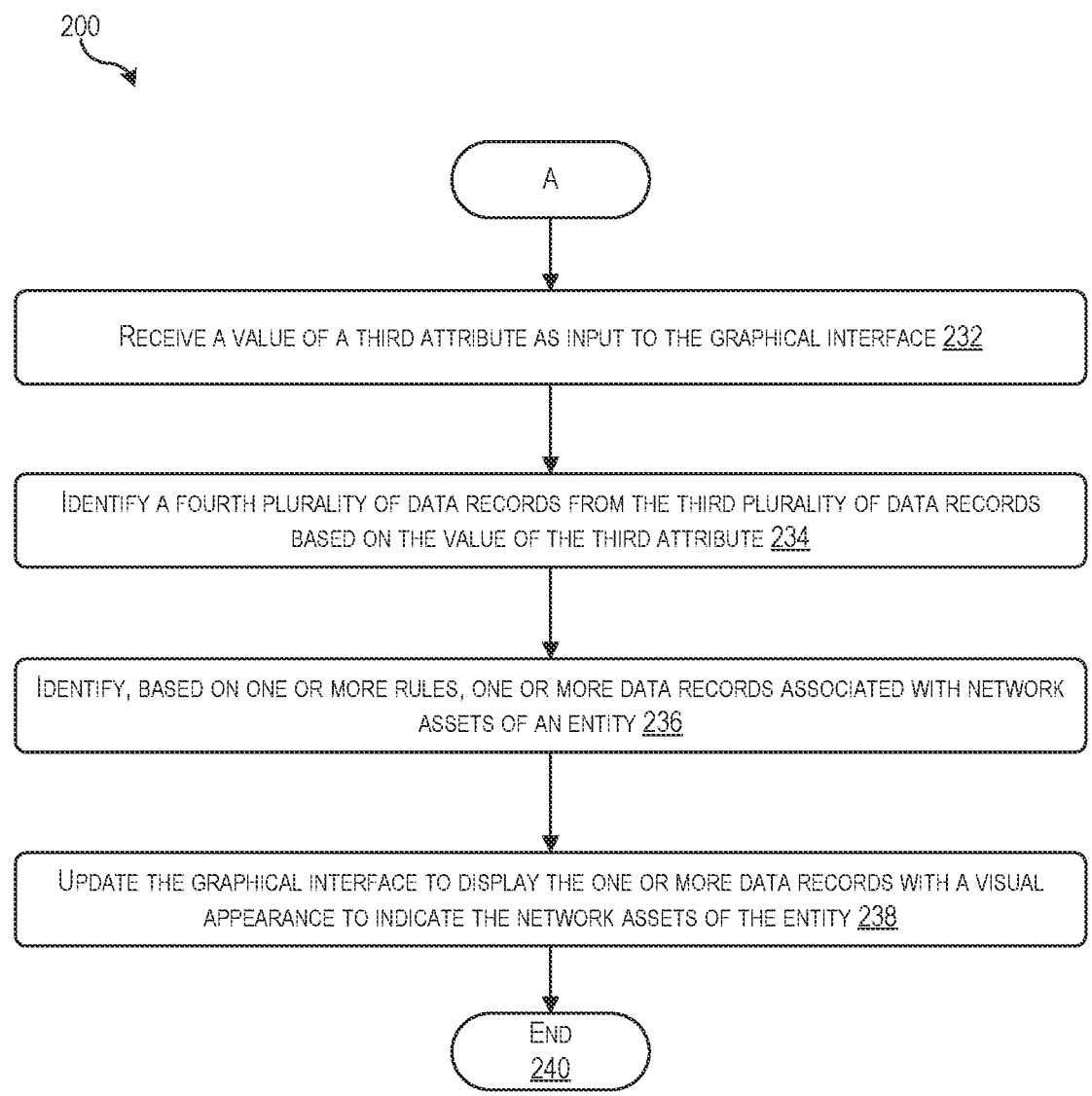

The network analytic system 120 may perform processes for determining network assets that are under common control and management of an entity according to some embodiments of the present disclosure. Network-based assets may be owned or associated with an entity (e.g., a company or network domain). The network analytic system can process network data from multiple data sources 170 to identify relationships between network-based digital assets. The graphical interfaces disclosed herein with reference to FIGS. 2A-2B are examples of graphical interfaces disclosed herein to facilitate the analysis of data to determine network assets under common control and management of an entity. Determining the network assets under common control and management of an entity may be useful for the entity in identifying all assets related to the entity. For example, the assets may be identified as being associated with a brand of an entity. The assets can be analyzed to determine which ones are misrepresented by another entity or person as falsely being associated with the brand. Alternatively, the assets under common control and management may be useful for identifying assets that are associated with a known malicious entity or an asset that is known to be malicious. In all examples, the data records corresponding to the identified assets may be presented with a visual appearance to enable a user to easily identify a relationship and/or different entities operating network assets as being associated with the same entity.

FIGS. 2A-2B illustrate a flowchart 200 of a process for determining network assets that may appear under common management of an entity. The network assets may be identified as posing a threat to the entity under which the network assets are associated. Flowchart 200 may begin by obtaining data from multiple data sources. Although some examples are disclosed herein with respect to a particular number and type of data sources, more or fewer data sources and/or types of data may be considered. For example, flowchart 200 may be implemented using two data sources to identify network assets under common management of an entity. The data may be obtained from one or more data sources, the order of which may be different from the examples disclosed herein. For example, data may be obtained from two data sources, although some examples are described with reference to more than two data sources. The data sources from which data is obtained may vary based on the attributes considered for determining management of network assets. The data may be obtained in real-time. The data may be updated periodically such that assessment of network assets may be accurate with respect to most recent network activity.

In at least one embodiment, flowchart 200 may include block 202 at which first data is obtained from a first data source. The first data may correspond to data about network activity for first network assets. For example, the first data source may be a DNS data source from which DNS data is obtained. Flowchart 200 may include block 204 at which second data is obtained from a second data source. For example, the second data source may be a WhoIs data source from which WhoIs data is obtained. The second data may be related to second network assets. Some or all of the second network assets may be included in the first network assets. Flowchart 200 may include block 206 at which third data is obtained from a third data source. For example, the third data source may be a web data source. Third data may be related to third network assets. Some or all of the third network assets may be part of the second network assets and/or the first network assets.

In one embodiment, a first data source may include DNS data, a second data source may include web data, and a third data source may be HTTP header data. In this example, the first data source may be used to identify unique network assets. The web data source may be used to retrieve web pages associated with the network assets from the first data source. The HTTP header data may be used to identify unique HTTP redirect headers for each of the web pages. Data records may be generated for each unique network asset including data obtained from other data sources for attributes of those network assets. The HTTP header data may be useful to identify related redirect web pages associated with a web page for a domain. When generating data records for network assets based on multiple data sources, a seed (e.g., one or more criteria) may be used to identify unique network assets for the data records. For example, a seed term may be used to identify a domain for a website. Using the HTTP header data, a social media website may be identified as being referenced from the website of the domain. The social media website and the website of the domain based on the seed term may be associated with each other as being under common management and control because of the relationship. In one illustrative example, a web data source is used to identify a domain (e.g., Jonathan.com) based on a seed term (e.g., "Jonathan"). The HTTP header data for the domain may be used to identify another domain having a social media website Facebook.com/Jonathan. On Facebook.com/Jonathan a reference is made to the website Jonathan2.com. In this manner, the websites Jonathan2.com and Jonathan.com may be identified as being associated with the same entity under common management or control having the attribute "Jonathan" and the relationship between network assets through use of web data and HTTP header data.

Figure 4:
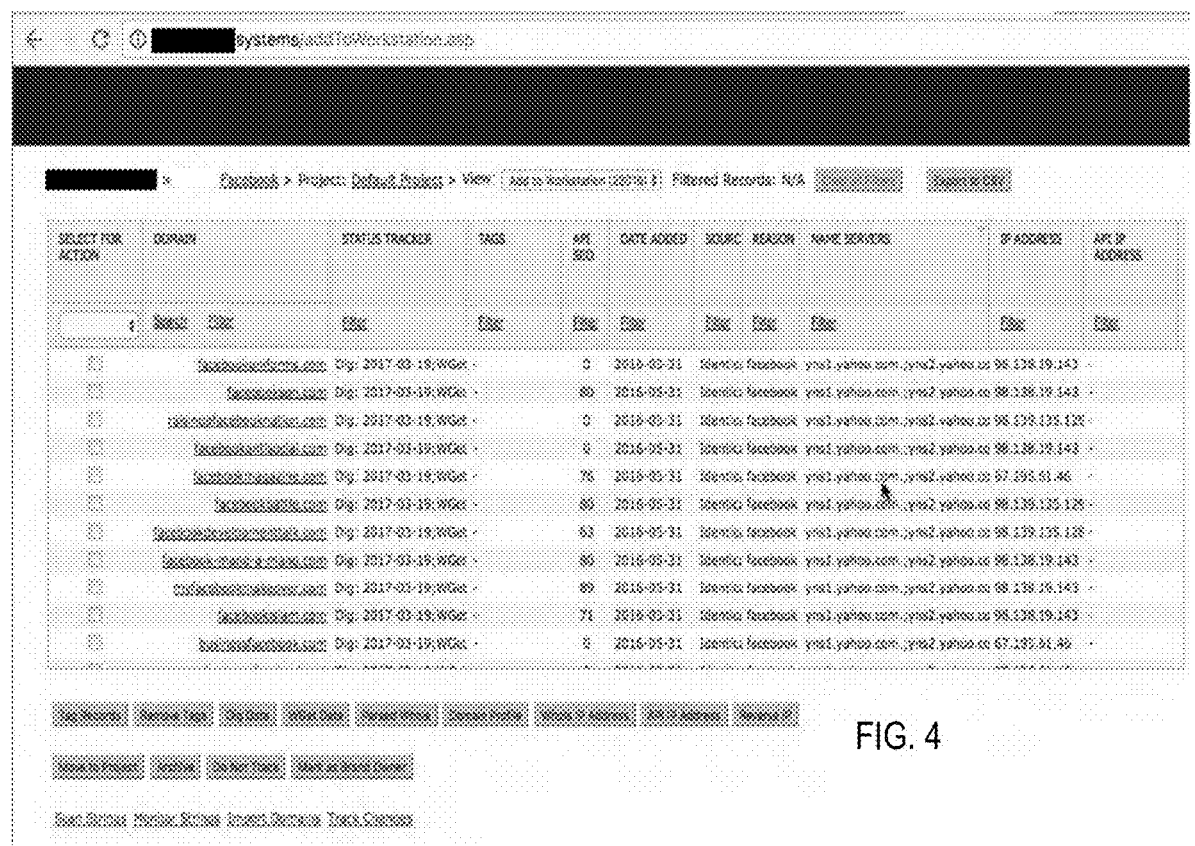

At block 208, a graphical interface may be generated to receive one or more criteria for initiating analysis of data from the data sources. For example, the input indicates a name of an entity for which data obtained from the data sources may be analyzed with respect to the entity. The data may be obtained from the data sources before input is received. In some embodiments, the data may be obtained from the data sources according to satisfaction of the one or more criteria. For example, data may be obtained that includes one or more attributes that match or include the criteria. At block 210, input is received based on interaction with the graphical interface. The input may correspond to one or more criteria. In at least one example, the graphical interface of FIG. 4 shows input defining one or more criteria (e.g., "facebook"), such as a name of an entity. The graphical interface may be displayed without data from the data sources data is processed based on the input.

At block 212, fourth data may be generated based on the first data, the second data and the third data. The fourth data may be generated based on processing a combination of the data obtained from the data sources. The fourth data may include a plurality of data records, each of the plurality of data records corresponding to a different network asset (e.g., a domain). Each of the data records may include data corresponding to a plurality of attributes with respect to the network asset for that data record. The data corresponding to the attributes may be obtained from one or more of the first data, the second data, or the third data. In some embodiments, data record may store a reference to the data corresponding to an attribute rather than the data itself. Each data record may include data corresponding to each of the plurality of attributes.

Processing the data from the data sources may include adjusting a format of the data from each of the data sources to a single format for generating the data records. Processing may include deduplication where data from different sources includes data for a particular attribute. The data records may be generated based on a map or a data structure defining the attributes. The map or data structure may be generated based on identifying each unique attribute for processing of the data from the data sources. In some embodiments, the fourth data is generated using one or more rules that define the data from different sources with respect to attributes. The rule(s) may indicate a relationship of the data between different sources. The data from each of the data sources may be parsed or processed to identify data for different attributes. Data from the data sources may be processed using parsing techniques known a person of ordinary skill in the art.

The data from data sources may be in different formats and/or may include different types of data that demand different parsing techniques. In some embodiments, processing data to generate the fourth data may include implementing a deconfliction process on the adjust (e.g., normalize) the data to a common or standardized format from different formats of the data obtained from different sources. The data may be normalized to a format in which the may be determined for an attribute. Deconfliction may include adjusting the data obtained from different sources so that data is aligned in a format having particular attributes.

At block 212, the fourth data may be processed to identify data records that satisfy the one or more criteria. For example, the data in each of the records may be analyzed to determine if the data includes or is related to the one or more criteria. The fourth data may be reduced or filtered to the data records including the data satisfying the criteria. For example, the data records may be filtered to those that include "facebook" in the data for any of the attributes.

At block 214, the graphical interface may be updated to display a graphical interface (referred to herein as a "grid," a "grid interface," or a "online grid") of the data records in the fourth data. The grid and/or each of the data records may be interactive to receive input to perform operations, such as the examples disclosed herein. Each column corresponding to an attribute may be interactive to perform operations with the respect to the data records including data for that attribute. For example, the graphical interface of FIG. 4 may be shown with data records including "facebook."

In at least one embodiment, a grid interface may be implemented using techniques described in below. In a grid interface, each of the headers and data records may be interactive to dynamically adjust the view of data records. For example, each header may be a link that is interactive to provide a graphical interface to specify criteria for an attribute corresponding to that header. The grid interface may be implemented in functionality by program code.

Figure 28:
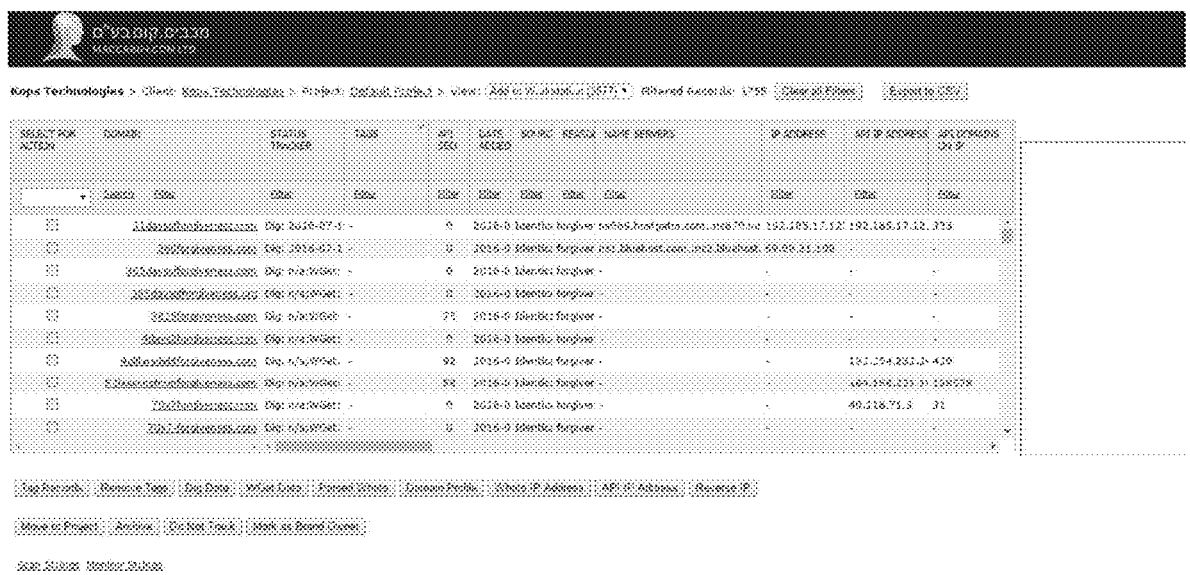
Figure 29:
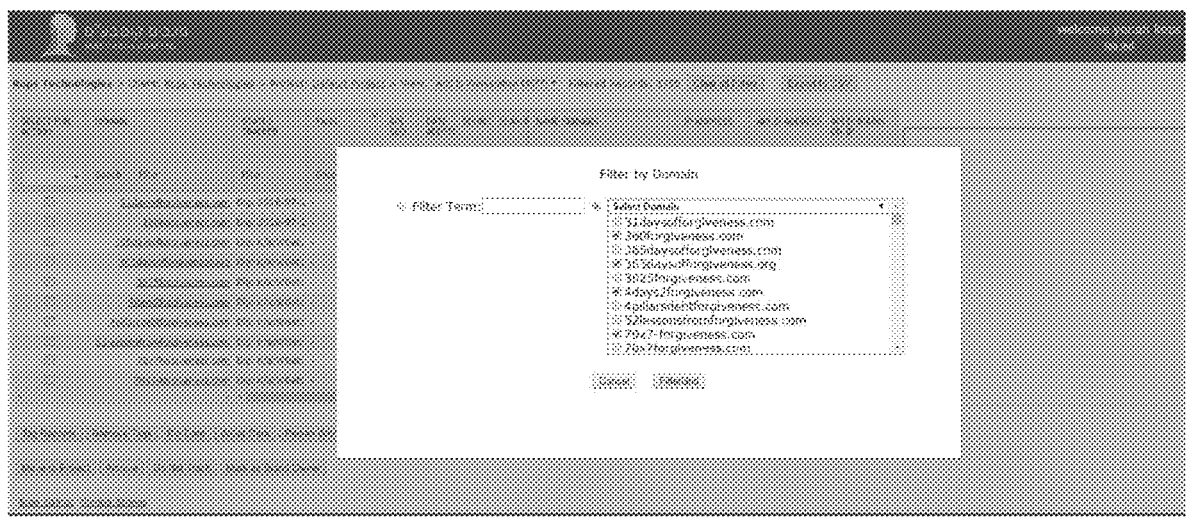
Figure 30:
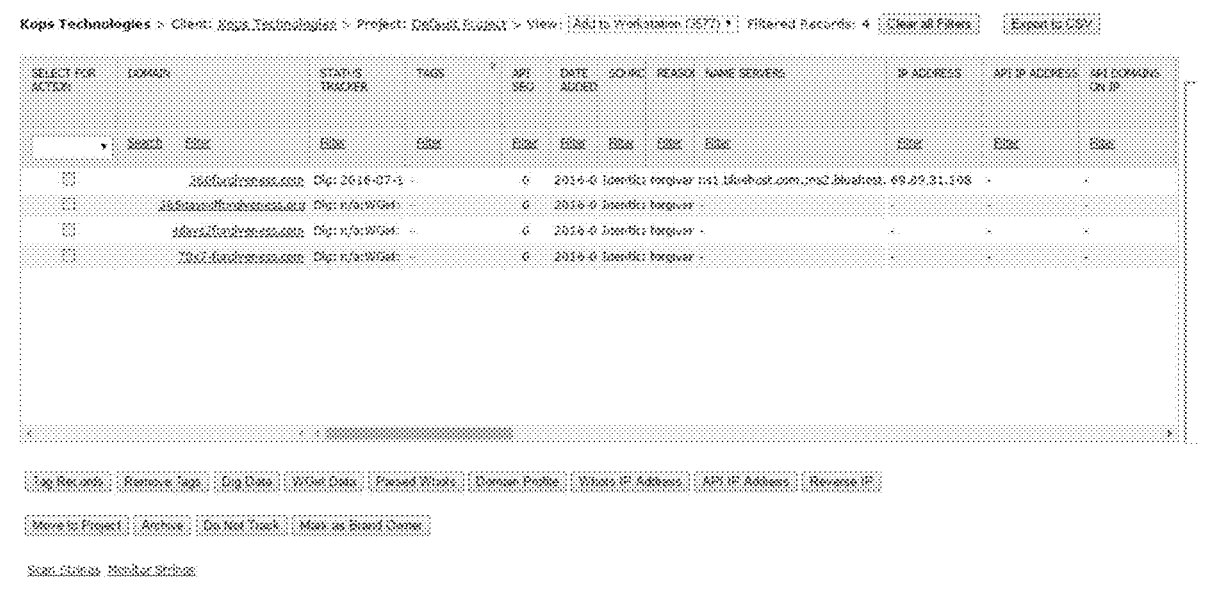

When the online grid is created, a link is added to fields in the header that allow the user to dynamically filter the grid view. This can be seen clearly in FIG. 28 where filter links are available for Domain, Tags, Date Added etc. to name a few. Program code creates the link in the grid. When clicking on the link, it leads to a JavaScript function that takes the filter column number that the user selected and creates an array of all unique results for the requested column in the active grid. The array is then parsed and returns a select box with the available results for the chosen column. The end result can be seen in FIG. 29. After a user selects their desired filter options and clicks on the 'Filter Grid' button this triggers a JavaScript function that creates an array of all the values that the user selected in the previous step and re-filters the current grid view to only show those domains whose column (global variable) value matches one of the options in the array. The function then calls another JavaScript function that closes the pop-up window. You are now left with a filtered online grid that can be seen in FIG. 30. This process can be repeated multiple times that enables effective drilling down from larger datasets.

Returning to FIG. 2A, at block 216, a value of a first attribute may be received as input to the graphical interface for filtering a first plurality of data records from the plurality of data records. At block 218, a first plurality of data records are identified in the plurality of data records as each having the value of the first attribute. For example, the input may be received in another graphical interface presented based on interaction with a column header of the grid interface, where the column header corresponds to the first attribute. For example, the attribute is a name server for which data is obtained from DNS data. The plurality of data records may be processed to identify a first plurality of data records that include the value of the first attribute. At block 220, the graphical interface may be updated to display the first plurality of data records.

At block 222, a value of a second attribute may be received as input to the graphical interface for filtering a second plurality of data records from the first plurality of data records. At block 224, a second plurality of data records are identified in the first plurality of data records as each having the value of the second attribute. For example, the input may be received in another graphical interface presented based on interaction with a column header of the grid interface, where the column header corresponds to the second attribute. For example, the attribute is a registrant for which data is obtained from WhoIs data. The first plurality of data records may be processed to identify a second plurality of data records that include the value of the second attribute. At block 226, the graphical interface may be updated to display the second plurality of data records.

In some embodiments, the graphical interface may be interactive to enable data records to be interacted with for assessing management of network assets associated with those data records. Each of the data records may correspond to at least one network asset. The graphical interface may be interactive to select one or more data records. Data records may be selected for being associates with an asset that is part of a group (e.g., an entity). The graphical interface may be interactive to enable selection of one or more attributes to specify one or more data records for selection. Data records may be selected at any stage of interaction with one or more data sources.

Data records may be selected to be removed from presentation. Data records may be removed for a variety of reasons including filtering, excluding, archiving, and/or storing. For example, data records may be selected for exclusion to reduce the number of data records relevant for analysis in determining network assets associated with an entity. The data records may be excluded as not being associated with an entity for common management of assets. In some embodiments, data records may be selected for being associated with an entity, a user, or a group (e.g., a brand owner). Data records may be selected to be excluded or not excluded depending on the focus of analysis of network assets for those data records. The data records may be excluded for indicating network assets that are not maliciously associated with an entity. Data records may be selected to be removed from presentation at any time. The graphical interface may be updated to display those data records not indicated for removal. Data records may not be displayed, or excluded from view, to minimize the number of data records for identifying assets under common management of an entity. In one example, at block 228, the second plurality of data records may be selected to be filtered from the plurality of data records.

In some embodiments, data records may be selected to be managed in a special manner. For example, data records may be selected to be managed for storage in a container as a collection (e.g., archive). Through one or more interactions with the graphical interface, data records may be selected for storage in one or more data storage containers. The containers may be used to aggregate data records for network assets identified across one or more sessions. A container may be a data store separate from where the data records are stored for display in the graphical interface. In some embodiments, the container may be associated as an archive where data records for network assets may be stored. The container may be used as a source to obtain data records for network assets that have been archived. In some embodiments, a container may be associated with a group or a project for which data records are managed. The container may be designated for storage of data records selected by a user. The graphical interface may be interactive to enable a user to specify storage for data records, such as a container for managing the data records. For example, the graphical interface may be interactive to enable the user to specify an archive or a project for managing the data records. The graphical interface may be adaptive to display the data records in a container, such as an archive or a project. Data records may be displayed using a grid interface as disclosed herein. The grid interface for a container may be interactive as disclosed herein for graphical interfaces. Containers may be linked or associated with one another based on sharing a data record. Such relationships may be visually displayed to enable a user to pivot between data records in different containers.

At block 230, the graphical interface may be updated to display a third plurality of data records from the plurality of data records remaining after exclusion of the second plurality of data records.

At block 232, a value of a third attribute may be received as input to the graphical interface for filtering the a fourth plurality of data records from the third plurality of data records. At block 234, a fourth plurality of data records are identified in the third plurality of data records as each having the value of the third attribute. For example, the input may be received in another graphical interface presented based on interaction with a column header of the grid interface, where the column header corresponds to the second attribute. For example, the attribute is a title in the web data in the fourth plurality of data records.

At block 236, the fourth plurality of data records may be processed against one or more rules to identify one or more data records corresponding to network assets that are related to the entity (e.g., "facebook"). Specifically, the data records may be identified as each storing data about a network asset associated with an entity. In some embodiments, the data records may be identified based on one or more attributes. The entity may be one in which a user is trying to identify network assets managed by or associated with the entity. The data records may be useful to identify those network assets that pose a security threat by being associated with an entity, but being unauthorized as not under the management and control of the entity. One or more rules may be applied to one or more attributes used to determine the management and control of the network assets for an entity. The rules may be defined based on one or more conditions considering one or more attributes, such as a first attribute, a second attribute, and a third attribute. At block 238, the graphical interface is updated to display the plurality of data records (e.g., fourth plurality of data records). One or more of the fourth plurality of data records may be updated with a visual appearance to indicate those data records identified at block 236.

At block 240, flowchart 200 may end.

III. Computer Systems for a Network Analytic System and a Client System

Figure 3:
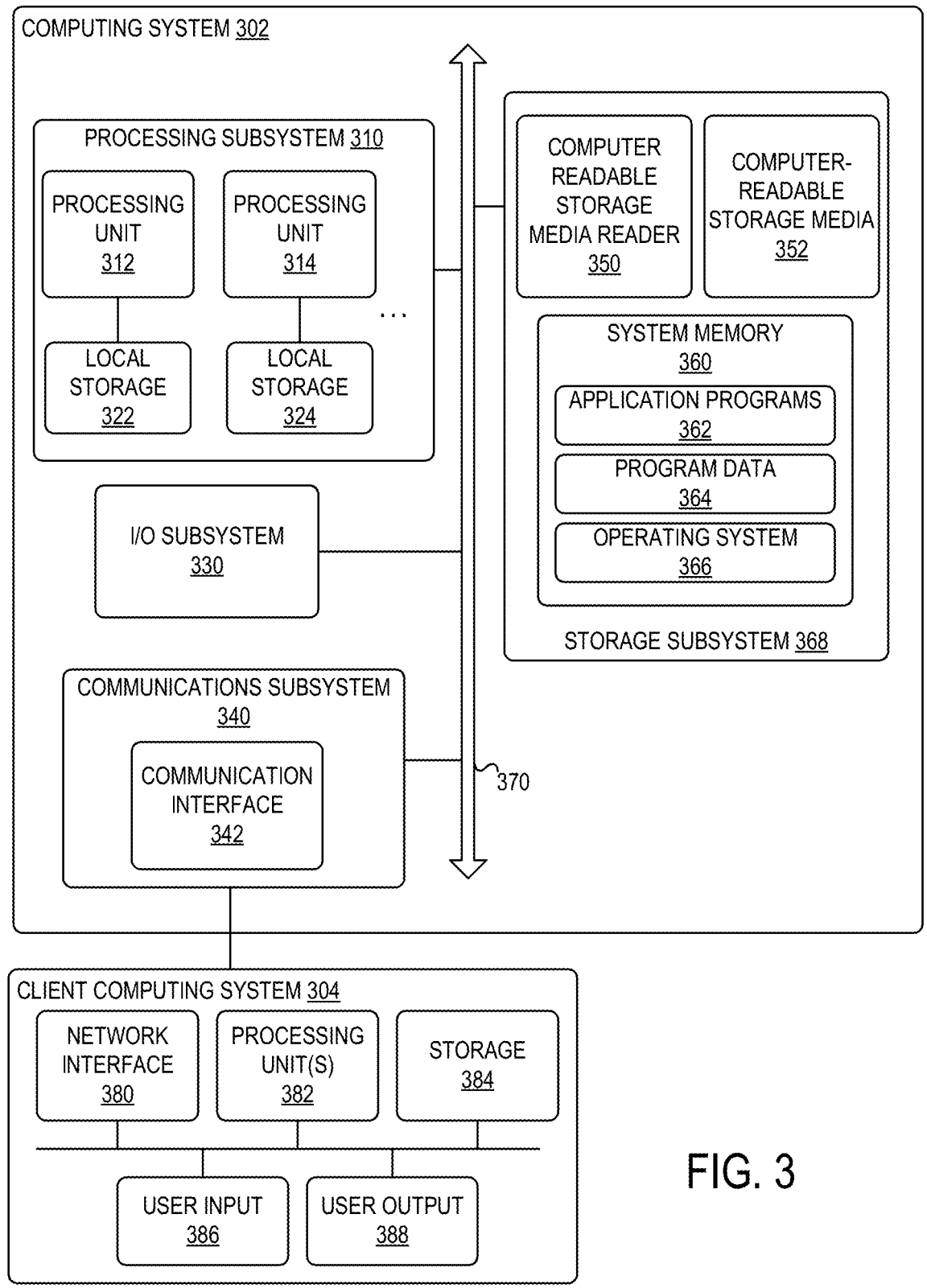
FIG. 3 shows a simplified block diagram of a computing system and a client computing system usable to implement some embodiments.

Various operations disclosed herein may be implemented on computer systems, which may be of generally conventional design. FIG. 3 shows a simplified block diagram of a representative computing system 302 and client computing system 304 usable to implement certain embodiments of the present disclosure. In various embodiments, computing system 302 or similar systems may implement network analytic system 120, or any other computing system disclosed herein or portions thereof. Client computing system 304 or similar systems may implement client system 104, or other client systems disclosed herein.

Computing system 302 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 302 may include processing subsystem 310. Processing subsystem 210 may communicate with a number of peripheral systems via bus subsystem 270. These peripheral systems may include I/O subsystem 330, storage subsystem 368, and communications subsystem 340.

Bus subsystem 370 provides a mechanism for letting the various components and subsystems of server computing system 304 communicate with each other as intended. Although bus subsystem 370 is shown schematically as a single bus, alternative embodiments of the bus subsystem may utilize multiple buses. Bus subsystem 370 may form a local area network that supports communication in processing subsystem 310 and other components of server computing system 320. Bus subsystem 370 may be implemented using various technologies including server racks, hubs, routers, etc. Bus subsystem 370 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 330 may include devices and mechanisms for inputting information to computing system 302 and/or for outputting information from or via computing system 302. In general, use of the term "input device" is intended to include all possible types of devices and mechanisms for inputting information to computing system 302. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 302 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 310 controls the operation of computing system 302 and may comprise one or more processing units 312, 314, etc. A processing unit may include one or more processors, including single core processor or multicore processors, one or more cores of processors, or combinations thereof. In some embodiments, processing subsystem 310 may include one or more special purpose co-processors such as graphics processors, digital signal processors (DSPs), or the like. In some embodiments, some or all of the processing units of processing subsystem 310 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 322, 324. Any type of processors in any combination may be included in processing unit(s) 312, 314.

In some embodiments, processing subsystem 310 may be implemented in a modular design that incorporates any number of modules (e.g., blades in a blade server implementation). Each module may include processing unit(s) and local storage. For example, processing subsystem 310 may include processing unit 312 and corresponding local storage 322, and processing unit 314 and corresponding local storage 324.

Local storage 322, 324 may include volatile storage media (e.g., conventional DRAM, SRAM, SDRAM, or the like) and/or non-volatile storage media (e.g., magnetic or optical disk, flash memory, or the like). Storage media incorporated in local storage 322, 324 may be fixed, removable or upgradeable as desired. Local storage 322, 324 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 312, 314 need at runtime. The ROM may store static data and instructions that are needed by processing unit(s) 312, 314. The permanent storage device may be a non-volatile read-and-write memory device that may store instructions and data even when a module including one or more processing units 312, 314 and local storage 322, 324 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 322, 324 may store one or more software programs to be executed by processing unit(s) 312, 314, such as an operating system and/or programs implementing various server functions such as functions of network analytic system 120, or any other server(s) associated with network analytic system 120. "Software" refers generally to sequences of instructions that, when executed by processing unit(s) 312, 314 cause computing system 302 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 312, 314. In some embodiments the instructions may be stored by storage subsystem 368 (e.g., computer readable storage media). In various embodiments, the processing units may execute a variety of programs or code instructions and may maintain multiple concurrently executing programs or processes. At any given time, some or all of the program code to be executed may be resident in local storage 322, 324 and/or in storage subsystem including potentially on one or more storage devices. Software may be implemented as a single program or a collection of separate programs or program modules that interact as desired. From local storage 322, 324 (or non-local storage described below), processing unit(s) 312, 314 may retrieve program instructions to execute and data to process in order to execute various operations described above.

Storage subsystem 368 provides a repository or data store for storing information that is used by computing system 302. Storage subsystem 368 provides a tangible non-transitory computer-readable storage medium for storing the basic programming and data constructs that provide the functionality of some embodiments. Software (programs, code modules, instructions) that when executed by processing subsystem 310 provide the functionality described above may be stored in storage subsystem 368. The software may be executed by one or more processing units of processing subsystem 310. Storage subsystem 368 may also provide a repository for storing data used in accordance with the present disclosure.

Storage subsystem 368 may include one or more non-transitory memory devices, including volatile and non-volatile memory devices. As shown in FIG. 3, storage subsystem 368 includes a system memory 360 and a computer-readable storage media 352. System memory 360 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 302, such as during start-up, may typically be stored in the ROM. The RAM typically contains data and/or program modules that are presently being operated and executed by processing subsystem 310. In some implementations, system memory 360 may include multiple different types of memory, such as static random access memory (SRAM) or dynamic random access memory (DRAM). Storage subsystem 368 may be based on magnetic, optical, semiconductor, or other data storage media. Direct attached storage, storage area networks, network-attached storage, and the like may be used. Any data stores or other collections of data disclosed herein as being produced, consumed, or maintained by a service or server may be stored in storage subsystem 368.

By way of example, and not limitation, as depicted in FIG. 3, system memory 360 may store application programs 362, which may include client applications, Web browsers, mid-tier applications, relational database management systems (RDBMS), etc., program data 364, and one or more operating systems 366. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 352 may store programming and data constructs that provide the functionality of some embodiments. Software (programs, code modules, instructions) that when executed by processing subsystem 310 a processor provide the functionality described above may be stored in storage subsystem 368. By way of example, computer-readable storage media 352 may include non-volatile memory such as a hard disk drive, a magnetic disk drive, an optical disk drive such as a CD ROM, DVD, a Blu-Ray® disk, or other optical media. Computer-readable storage media 352 may include, but is not limited to, Zip® drives, flash memory cards, universal serial bus (USB) flash drives, secure digital (SD) cards, DVD disks, digital video tape, and the like. Computer-readable storage media 352 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 352 may provide storage of computer-readable instructions, data structures, program modules, and other data for computing system 302.

In certain embodiments, storage subsystem 368 may also include a computer-readable storage media reader 350 that may further be connected to computer-readable storage media 352. Together and, optionally, in combination with system memory 360, computer-readable storage media 352 may comprehensively represent remote, local, fixed, and/or removable storage devices plus storage media for storing computer-readable information.

In certain embodiments, computing system 302 may provide support for executing one or more virtual machines. Computing system 302 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 302. Accordingly, multiple operating systems may potentially be run concurrently by computing system 302. Each virtual machine generally runs independently of the other virtual machines.

Communication subsystem 340 provides an interface to other computer systems and networks. Communication subsystem 340 serves as an interface for receiving data from and transmitting data to other systems from computing system 302. For example, communication subsystem 340 may enable computing system 302 to establish a communication channel to one or more client computing devices via the Internet for receiving and sending information from and to the client computing devices.

Communication subsystem 340 may support both wired and/or wireless communication protocols. For example, in certain embodiments, communication subsystem 340 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 340 may provide wired network connectivity (e.g., Ethernet) in addition to or instead of a wireless interface.

Communication subsystem 340 may receive and transmit data in various forms. For example, in some embodiments, communication subsystem 340 may receive input communication in the form of structured and/or unstructured data feeds, event streams, event updates, and the like. For example, communication subsystem 340 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 340 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 340 may also be configured to output the structured and/or unstructured data feeds, event streams, event updates, and the like to one or more databases that may be in communication with one or more streaming data source computers coupled to computing system 302.

Communication subsystem 340 may provide a communication interface 342, e.g., a WAN interface, which may provide data communication capability between the local area network (bus subsystem 370) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 302 may operate in response to requests received via communication interface 342. Further, in some embodiments, communication interface 342 may connect computing systems 302 to each other, providing scalable systems capable of managing high volumes of activity. Conventional or other techniques for managing server systems and server farms (collections of server systems that cooperate) may be used, including dynamic resource allocation and reallocation.

Computing system 302 may interact with various user-owned or user-operated devices via a wide-area network such as the Internet. An example of a user-operated device is shown in FIG. 3 as client computing system 302. Client computing system 304 may be implemented, for example, as a consumer device such as a smart phone, other mobile phone, tablet computer, wearable computing device (e.g., smart watch, eyeglasses), desktop computer, laptop computer, and so on.

For example, client computing system 304 may communicate with computing system 302 via communication interface 342. Client computing system 304 may include conventional computer components such as processing unit(s) 382, storage device 384, network interface 380, user input device 386, and user output device 388. Client computing system 304 may be a computing device implemented in a variety of form factors, such as a desktop computer, laptop computer, tablet computer, smart phone, other mobile computing device, wearable computing device, or the like.

Processing unit(s) 382 and storage device 384 may be similar to processing unit(s) 312, 314 and local storage 322, 324 described above. Suitable devices may be selected based on the demands to be placed on client computing system 304; for example, client computing system 304 may be implemented as a "thin" client with limited processing capability or as a high-powered computing device. Client computing system 304 may be provisioned with program code executable by processing unit(s) 382 to enable various interactions with computing system 302 of a message management service such as accessing messages, performing actions on messages, and other interactions described above. Some client computing systems 304 may also interact with a messaging service independently of the message management service.

Network interface 380 may provide a connection to a wide area network (e.g., the Internet) to which communication interface 340 of computing system 302 is also connected. In various embodiments, network interface 380 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 386 may include any device (or devices) via which a user may provide signals to client computing system 304; client computing system 304 may interpret the signals as indicative of particular user requests or information. In various embodiments, user input device 386 may include any or all of a keyboard, touch pad, touch screen, mouse or other pointing device, scroll wheel, click wheel, dial, button, switch, keypad, microphone, and so on.

User output device 388 may include any device via which client computing system 304 may provide information to a user. For example, user output device 388 may include a display to display images generated by or delivered to client computing system 304. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 388 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 312, 314 and 382 may provide various functionality for computing system 302 and client computing system 304, including any of the functionality disclosed herein as being performed by a server or client, or other functionality associated with message management services.

It will be appreciated that computing system 302 and client computing system 304 are illustrative and that variations and modifications are possible. Computer systems used in connection with embodiments of the present disclosure may have other capabilities not specifically described here. Further, while computing system 302 and client computing system 304 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software While the disclosure has been described with respect to specific embodiments, one skilled in the art will recognize that numerous modifications are possible. For instance, although specific processes are disclosed herein, other processes may be implemented. Embodiments of the disclosure may be realized using a variety of computer systems and communication technologies including but not limited to specific examples disclosed herein.

Embodiments of the present disclosure may be realized using any combination of dedicated components and/or programmable processors and/or other programmable devices. The various processes disclosed herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

IV. Interfaces

Now turning to FIGS. 4-27, graphical interfaces are shown that are interactive for network analysis. The graphical interfaces illustrates various examples for detecting network assets under common control and management of an entity. Each graphical interface may be generated and managed network analytic system 120 of FIG. 1. A graphical interface may be modified to display additional information or one or more additional graphical interfaces such as those described with reference to the following figures. In some examples of this disclosure, multiple graphical interfaces are shown; however, multiple graphical interfaces may be displayed in more or fewer graphical interfaces. Although some embodiments are described with a graphical interface including one or more graphical interfaces, any number and combination of graphical interfaces may be provided according to techniques disclosed herein. An example of a graphical interface is a graphical user interface (GUI). Instead of a graphical interface included in another graphical interface, one or more interactive elements may be implemented in the graphical interface to enable the same functionality. In response to interaction with a graphical interface as disclosed herein, a network analysis system can perform processing to produce the information for an updated or new graphical interface and can produce the updated/new graphical interface. The processes described with reference to FIGS. 2A-2B may be implemented through interaction with a graphical interface. The graphical interface(s) disclosed herein may be accessible (e.g., rendered) at a client system (e.g., client system 104 of FIG. 1).

In this disclosure, "an element" may be included in an interface. An element may be displayable and/or part of an interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. In some embodiments, the graphical interfaces disclosed herein can be displayed with or in response to interaction with a graphical interface of an application or a website. For example, the graphical interfaces disclosed herein may be displayed with applications and services, such as without limitation, RiskIQ Digital Footprint™ and RiskIQ PassiveTotal™.

FIGS. 4-27 illustrate examples of interfaces that are interactive to enable a user to pivot between multiple data sources of data about network activity to determine network-based assets under management by a single (e.g., common) entity. The interfaces may be graphical interfaces (e.g., a graphical user interface) that can be displayed in an application (e.g., a browser application) by a client system.

In some embodiments, some interfaces in FIGS. 4-27 illustrate an interactive interface, such as an interactive grid interface (also referred to herein as a "grid interface") that is interactive for pivoting from records across multiple data sources to identify relationships between network-based assets. The interactive grid interface can be shown as a grid (e.g., a table) displaying information for one or more data records, each data record comprised of data from multiple, different data sources. Although shown as a grid, the interactive interface may be displayed in other formats or styles for presenting data records as disclosed herein. The data in the records may be determined based on data from multiple sources according to techniques disclosed herein. The records may be determined based on a search conducted according to input provided in an interface. The input may indicate one or more criteria, such as one or more attributes associated with network-based assets. For example, an input may be a name of an entity.

The interactive grid interface may include one or more rows, each row corresponding to a data record. Each row may display information in a data record. Information displayed in each row may be shown in one or more columns. The information displayed in each row for a column may be based on data from one or more sources. The interactive grid interface may be interactive by providing one or more elements for each column of information displayed for the rows. The elements for each column may be interactive to receive input to configure one or more operations for the rows based on the information in the column for the rows. Examples of operations may include, without limitation, filter, search, and sort.

In some embodiments, multiple data records displayed in the interactive grid interface may be interactive to configure with respect to one or more operations (e.g., filter, sort, or search). Each row may include or be associated with an interactive element that enables an operation to be performed with respect to the row. The grid interface may be interactive to selectively flag data corresponding to information in the interface. A user may select all or part of one or more rows for analysis (e.g., flagging). The portion of a row corresponding to a column may be flagged. The flagged portions of the grid interface may be modified in appearance to indicate the flagging. The flagging may remain throughout interaction with the grid interface with respect to the underlying data for each row, such that if the data records are reduced by interaction with the grid interface, those data records corresponding to the flagging, which remain after the interaction may be shown as, flagged. This may enable a user to visually focus on information that is relevant through interactions with the grid interface.

In some embodiments, the information displayed in a row, such as information displayed in a row for a specific column, may be interactive based on data underlying the information. For example, for information that is an address (e.g., a URL), the information may be interactive as a hyperlink to enable interaction to access the address. In some embodiments, an interface displaying the interactive interface may be modified to display another interface of information accessed based on the address. For example, interaction with a URL in a row may cause an interface to display a web document accessed based on the URL. The interface may be with, instead of, or overlaid on top of, the interactive grid interface.

In some embodiments, an interface displaying the interactive grid interface may include one or more elements that are interactive to perform one or more operations with respect to the information displayed in the interactive grid interface. One operation may be an export operation to generate a file (e.g., a comma separated values (CSV) file based on the information displayed in the interactive grid interface. In some embodiments, the file may be generated in a format similar or identical to that, which is displayed in a grid interface. The file may be generated based on what is seen by the user at the moment the file is created. Therefore, a user may generate a file based on the results of identifying records that are related through interactions with the grid interface. Another operation may be to create a project with respect to the records identified for display in the interactive grid interface. In some embodiments, the interactive grid interface may be displayed with information (e.g., statistical information about records based on filtering) about the records which are displayed in the interactive grid interface. Another operation may include displaying an interface with information from data for records corresponding to a particular attribute of a column. The grid interface may be modified and/or regenerated to display data in the data records with respect to the attribute of a column.

The techniques disclosed with reference to the interfaces for FIGS. 4-27 enable a user to pivot through multiple different data sources related to network-based assets to detect network-based assets that are under common management of an entity. Such a determination may be useful for identifying whether any network-based assets are controlled by an unauthorized entity and/or whether any unauthorized entities are controlling network-based assets that are appearing to be associated with or represented as network-based assets of an different, authorized entity. The examples described with reference to FIGS. 4-27 enable a user to pivot, connect through multiple different data sources, which may be useful for identifying network-based assets defining a pattern of common management by an entity. The data sources may be disparate such that a user would not be able to parse through the volumes of data in real-time to identify a relationship of network-based assets. The interfaces enable a user to provide input to drive an algorithmically driven interface of network analytic system to determine relationships between data between different sources. The relationships determined based on user input may enable the data records to be selectively determine (e.g., filer) data relevant to a particular inquiry. The interfaces can be configured to receive multiple inputs, which after each input, the interactive grid interface may be adjusted and/or regenerated to display different and/or a subset of information from data records relevant based on the input. Through the series of input, the interface may be adaptive to display data corresponding to a subset of records for network-based assets having a relationship defined based on the input. The resulting data records, which are displayed in the interactive grid interface, may be useful to identify whether any network-based assets are owned by different entities, and/or whether any of those entities are unauthorized based on the relationship and/or information included in the records for the remaining records.

In some embodiments, the grid interface may be presented with one or more visual appearances and/or audible sounds. Visual appearances may include color, animation, flashing, or any other type of appearance that may be rendered in an interface for visual perception by a human. For example, one or more records may be presented with a visual appearance to identify all or some information that indicates network-based assets, which are relevant for inquiry. The relevance may be identification of an entity associated with the information, or may be identification of assets, which are suspect of malicious activity of an entity. The presentation in the grid interface may occur after one or more inputs are provided to drive analysis of records to identify a relationship. The grid interface may be regenerated or updated based on each interaction with the grid interface. Each time the grid interface is displayed, one or more records, or specific information displayed in each record may be presented to indicate a relationship, if any, determined at that instance. In some embodiments, multiple rows or related information across multiple rows may be presented with visual and/or audible sounds to indicate a possible relationship between records. The rows which are identified as having a relationship may be interactive to pivot to data associated with the values selected (e.g., highlighted) in those rows. Thus, a user may be able to selective drive processing based on assistance indicated by presentation of information that may be related.

FIGS. 4-27 illustrate a sequence of interfaces displayed based on interaction (e.g., input) by a user into a grid interface according to some embodiments. The interaction(s) may drive analysis of the data records corresponding to network-based assets identified across multiple sources. In the example of the FIGS. 4-27, information is displayed in a grid interface for multiple records generated based on three data sources including a WhoIS data source, a zone file data source, and an SEO data source. Each of the data sources may include data that is distinct. The data records may be determined for the grid interface based on input to an interface indicating one or more criteria. The data records may be generated to include data indicating information about one or more unique attributes, which can be determined for each data record. Each data record may include one or more attributes. The attributes in a data record may be based on the data sources used to generate the data records. In this example, the criteria include a name of an entity, such as "Facebook." The criteria may be obtained through an interactive interface. Using the criteria, network analytic system may perform operations to generate data records satisfying the criteria. In some embodiments, a data record may be identified as satisfying the criteria if one or more attributes (corresponding to each column) in the data record include or is related to "Facebook" in any way. In this example, each data record may be generated for each unique domain that includes the term "Facebook." For each unique domain, a data record is generated with unique data may be retrieved from each of the data sources for the domain. Data may be retrieved with respect to one or more additional criteria that are specified with "Facebook."

FIG. 4 illustrates an interface displaying an interactive grid interface generated based on input (e.g., "Facebook") provided in an interface as criteria by a user to identify network-based assets associated with or related to "Facebook." The grid interface is displayed with multiple rows, each row presented with information from a unique each data record generated based on the input. In each data record for a row may have information obtained from data sources for the domain satisfying the input. Each row is displayed with information corresponding to multiple columns, which correspond to attributes for which data is retrieved for the domain in the row. In this example, although not displayable, the grid interface presents over 22,000 rows. In some embodiments, a grid interface may be interactive to adjust display of the rows (e.g., scroll) if not all rows are visible. Due to the number of data records displayed, a user may not be able to process the data records in an efficient and reliable manner to determine a relationship between the data records. Without a grid interface, a user may not be able to selectively interact with the underlying data to select one or more data records with interesting attributes that may be useful for identifying a relationship between network-based assets under control of an entity.

Figure 5:
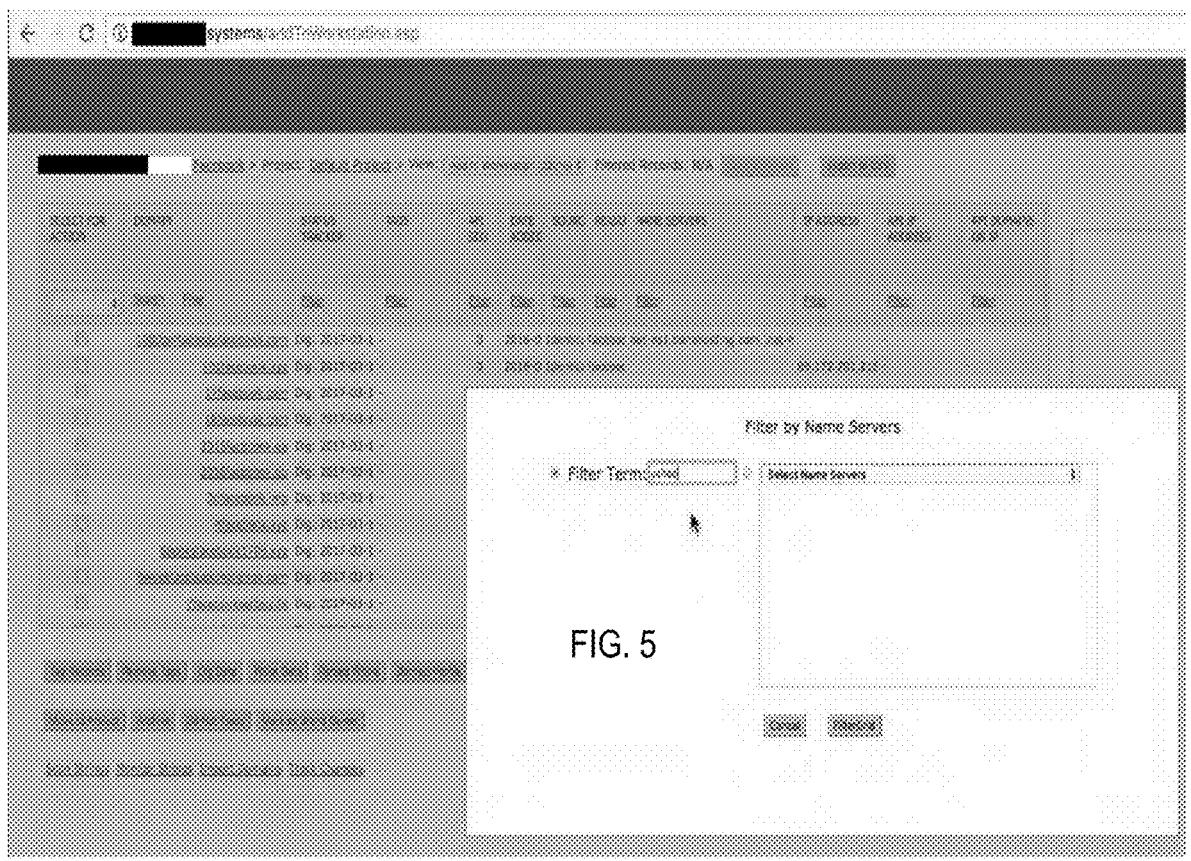

Now turning to FIG. 5, an interface is show for performing an operation with respect to the data displayed for data records in the grid interface of FIG. 4. The interface of FIG. 5 may be displayed based on interaction with an element of the grid interface. For example, an element of a column may be interactive to perform an operation (e.g., filter) the data corresponding to the column with respect to the data records. In the example of FIG. 5, the interface for filtering by "Name Server" is shown based on interaction with an element of the column "Name Servers" in the gird interface of FIG. 4.

In FIG. 5, a user may provide input to select one or more name servers to filter on. The input may be provided by selection of one or more name servers presented in the grid interface or specification of criteria as input indicating all or part of a name server. The criteria may be selected to filter or reduce the number of data records to identify a pattern or relationship within a subset of data records based on one or more attributes. Here, the user has noticed that "Yahoo" is a name server to filter for the possibility of identifying a malicious network-based asset. In FIG. 5, a user has provided input of "Yahoo" to filter name servers with the term "Yahoo" to reduce the data records down to possible network activity involving specific network-based assets. The data records may be filtered on any number of attributes, such as a name server, to eliminate data records for network activity that may or may not be known as malicious. The filtering enables the data records to be identified and then later removed from view to as to minimize the focus on data records for network activity that may be unknown. Now turning to FIG. 6, the grid interface of FIG. 4 is shown as updated in real-time to display the data records filtered based on input shown in FIG. 5. The 22,000 data records displayed in FIG. 4 are filtered down to 29 data records, each having data for a name server including the term "Yahoo" as specified in the interface of FIG. 5.

By filtering on a specific name server, a user may identify data records to eliminate as likely not being associated with malicious activity based on a name server that is known, or not associated with malicious activity. In some embodiments, the interface of FIG. 5 may be interactive to suggest one or more terms that be may be selected for filtering, such as terms that appear in more than one entry. Filtering the data records based on an attribute (e.g., a name server) corresponding to data from one data source (e.g., a source that provided DNS data), enables a user to pivot to focus on data records based on other data sources.

In some embodiments, a grid interface may be interactive to display a web document accessible at a location indicated in each of the rows. For example, in FIG. 6, a row corresponding to data record for domain "greatfacebook.net" may be interactive (or the domain field in the row) to cause a web document at a source for the domain to be displayed in an interface next to the grid interface. Here, the webpage at "greatfacebook.net" is displayed in an interface next to the grid interface. The interface that enables a user to view a web document for each of the rows enables a user, in real-time, to actively view the content at a source corresponding to any data record to determine the current real-time status and/or content of the source for assessment.

Figure 6:
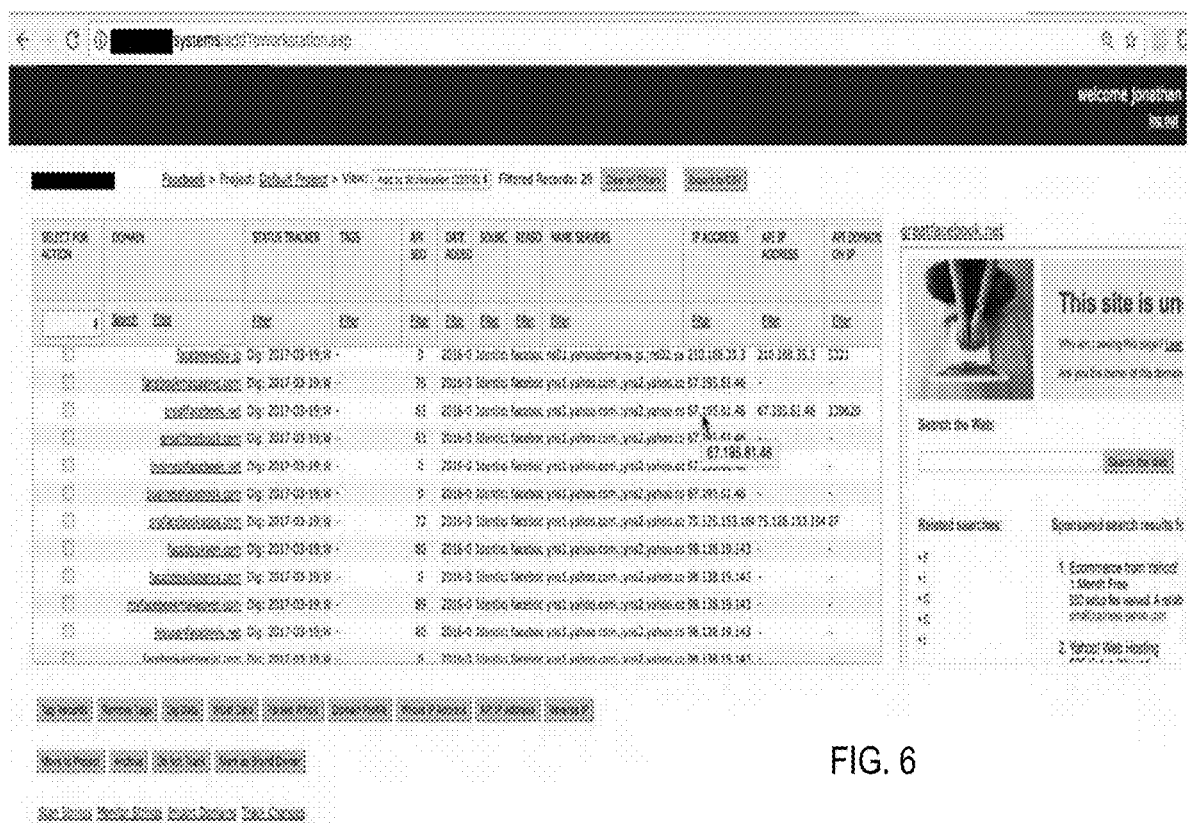
Figure 7:
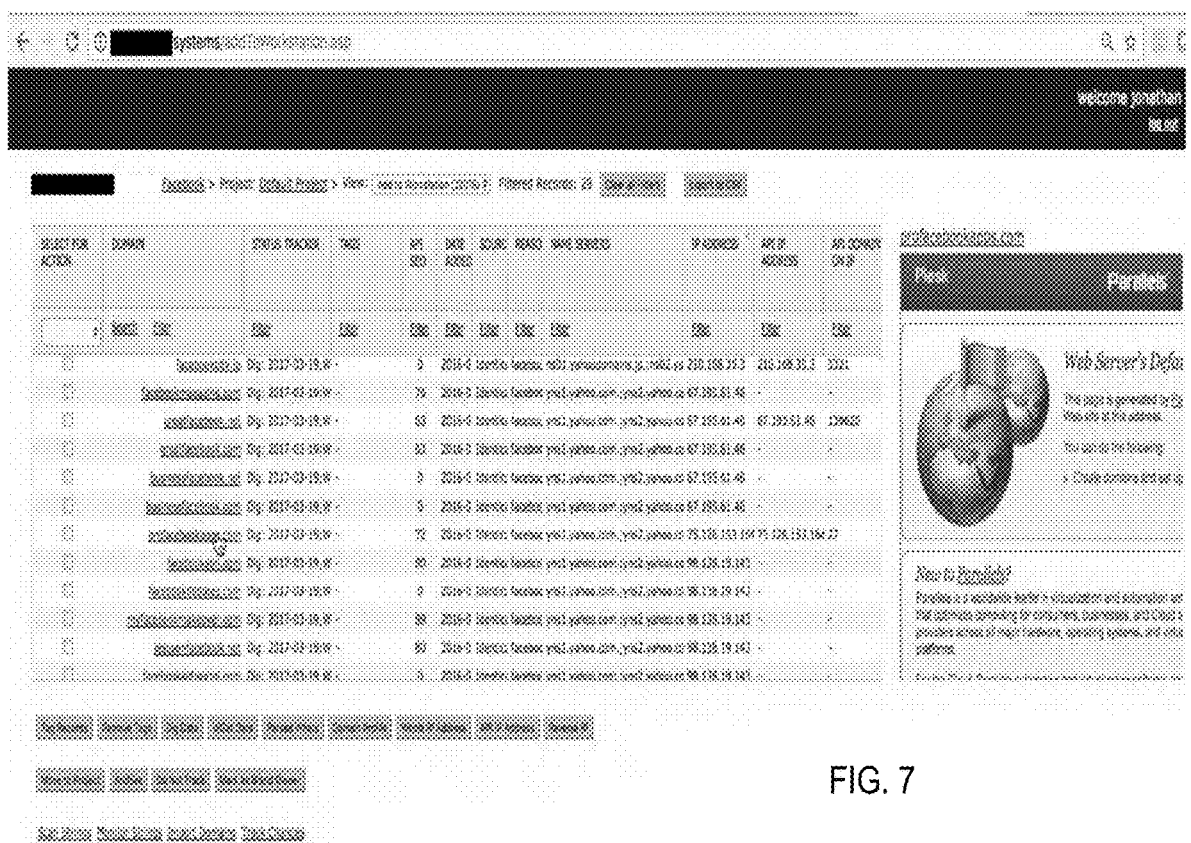

FIG. 6 illustrates features that enable a user to selectively adjust display of data records based on interaction with the grid interface. In addition to viewing content at each domain, a user may adjust display of data in the grid interface based on one or more attributes corresponding to columns. In this example, a user may further interact with an element of the "IP Address" column corresponding to an IP address attribute to selectively sort each of the rows based on the "IP address" attribute. In this example, an interaction to sort the data records by IP address reveals several rows that share a common IP address and some rows which have a unique IP address. The rows having a unique IP address may be flagged (e.g., automatically or based on interaction with the grid interface). The rows which have IP addresses that are interesting (e.g., either similar or different) for identifying a possible relationship or lack thereof may be noted. The IP address may be used to determine further interaction to change the display of data records with respect to the identified rows.

The interface displayed next to the grid interface may be useful to further enable a user to investigate content at one or more domains being assessed for the interesting IP addresses. Reviewing the content may enable a user to determine which, if any, of the domains may be suspect for malicious activity. The grid interface of FIG. 6 is shown continuing onto FIG. 7. Interaction with another domain "profacebookapps.com" causes an interface next to the grid interface to display the content of a web document accessible at that domain.

Figure 8:
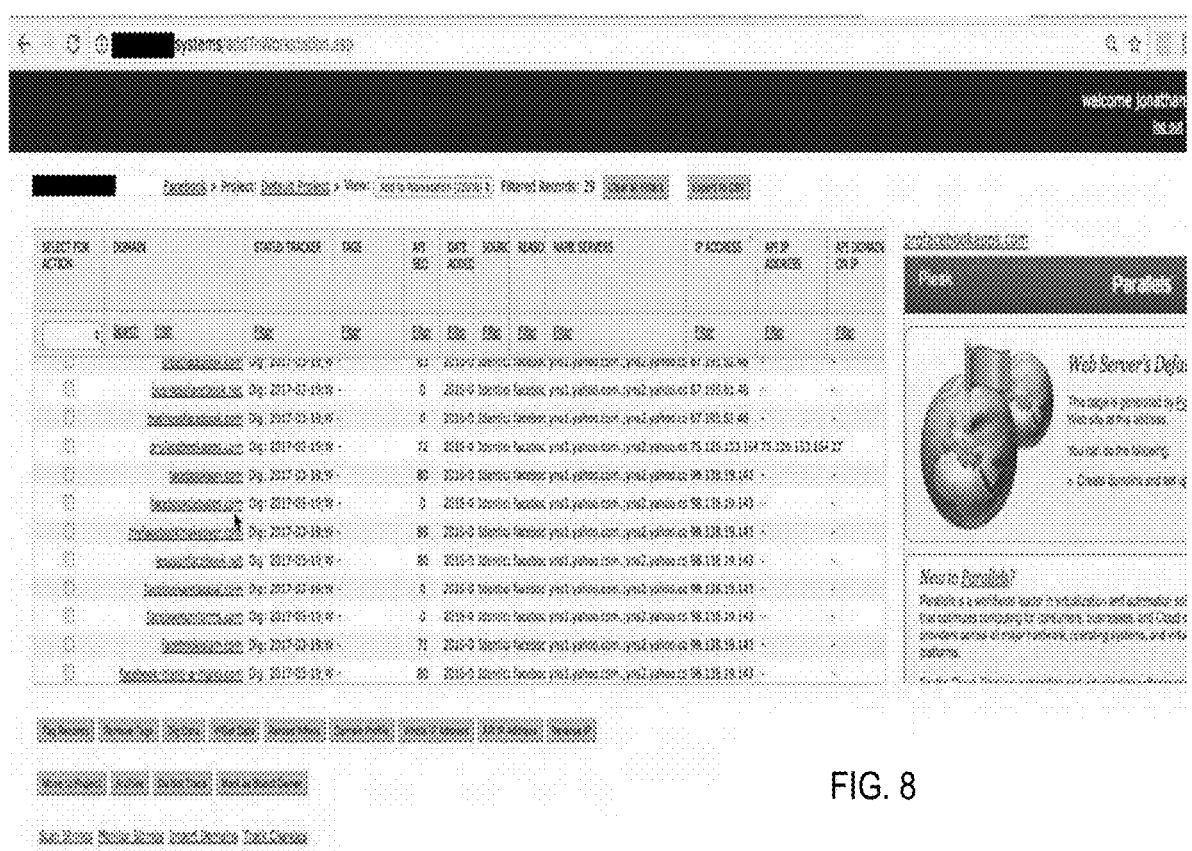
Figure 9:
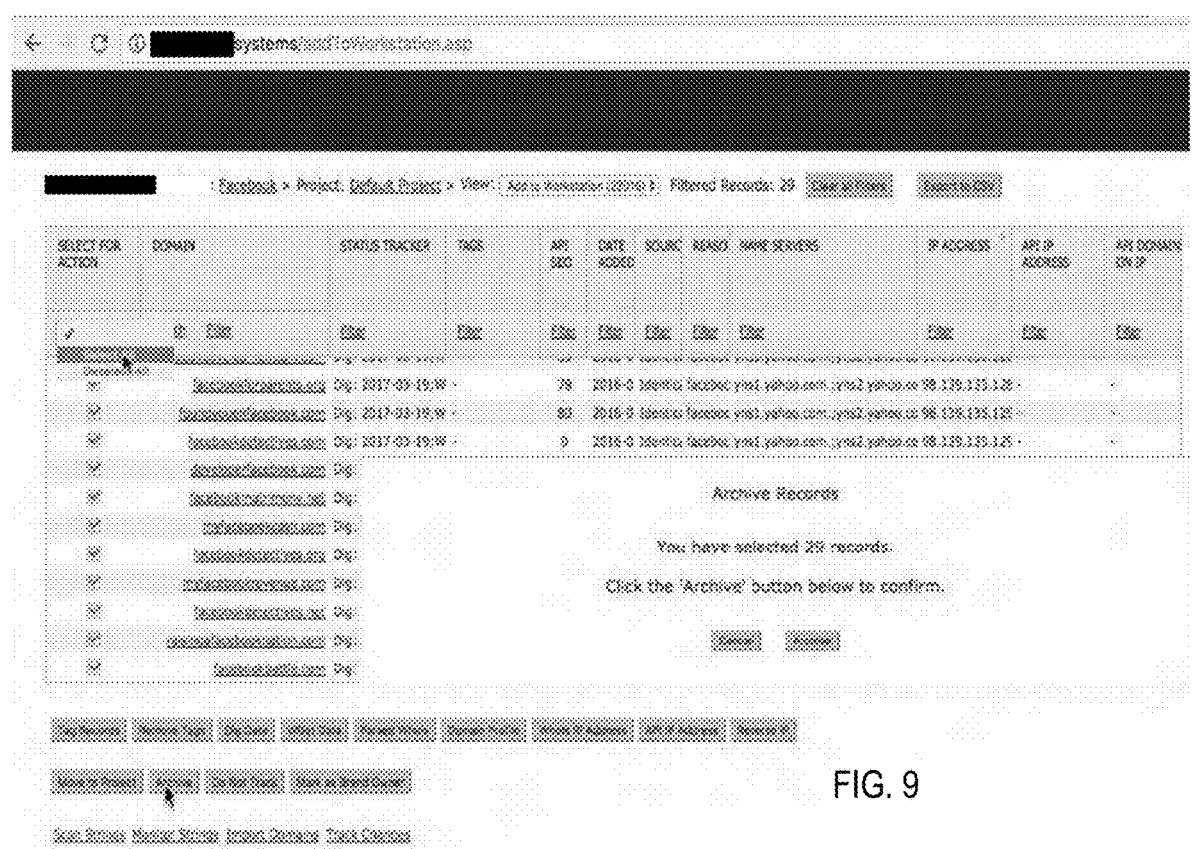

FIG. 8 illustrates an updated view of the grid interface based on interaction to scroll to view more rows that are not visible. A user may further assess the domains of interest based on viewing more rows. FIG. 8 illustrates an interactive feature enabling a user to perform one or more operations based on specifying input (e.g., an action) with respect to selection of one or more records in the grid interface. A column may include an interactive element to select one or more records, such as rows in the grid interface. In the example shown in FIG. 9, a user can specify input to archive the data records corresponding to the selected rows. In the example shown in FIG. 8, 29 records are viewable in the grid interface based on specifying "Yahoo" as a name server according to techniques shown in FIG. 5. The ability to reduce thousands of data records to a small set of records is useful for reducing the data records to enable easier identification of data records relevant to potential malicious activity under common management by an entity. The ability to archive data records enables a user to save those data records about network activity for further analysis or reference. An action that enables a user to archive records is further beneficial to enable those records to be excluded or removed from further analysis so that the analysis can be directed on another aspect of malicious activity. FIG. 9 illustrates a graphical interface that can be displayed to specify the action, such as archive. The archived data records may be stored in a data source that is distinct from the data sources from which the data records were obtained. The graphical interface in FIG. 9 may be updated or a new graphical interface may be generated to display the grid interface with data records that remain visible based on user input, such as data records that are not archived.

Figure 10:
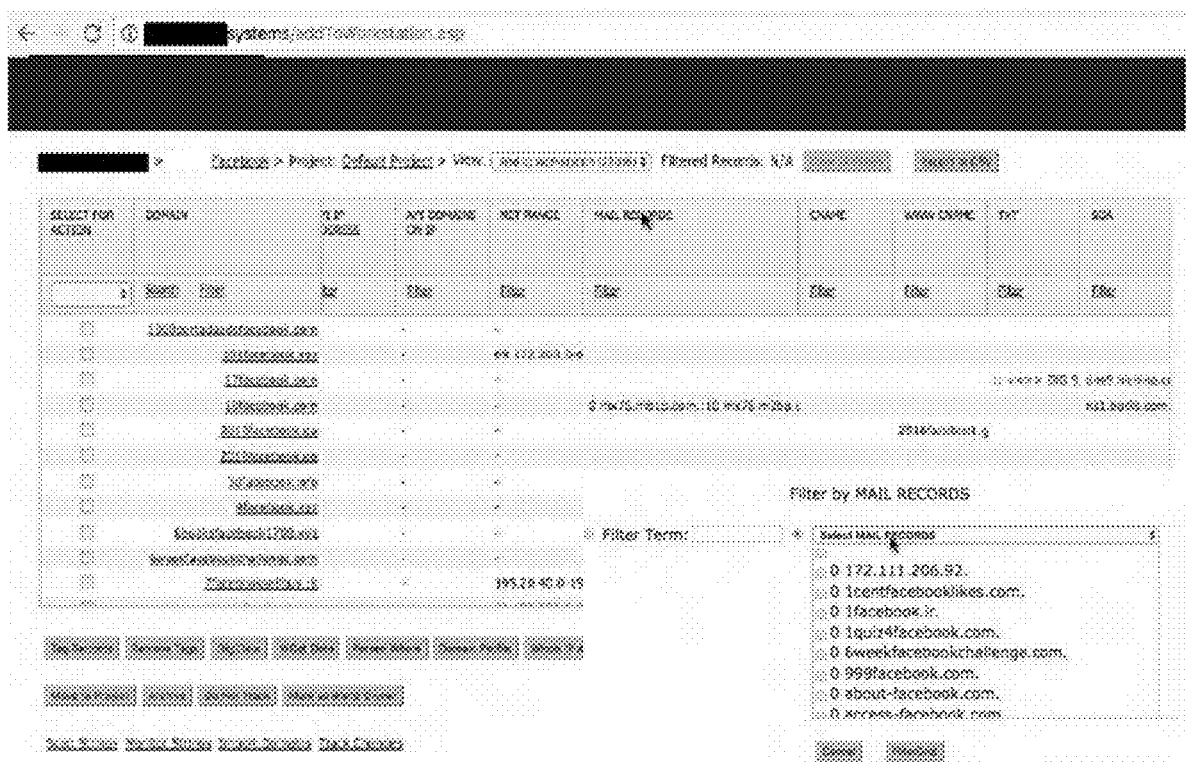
Figure 11:
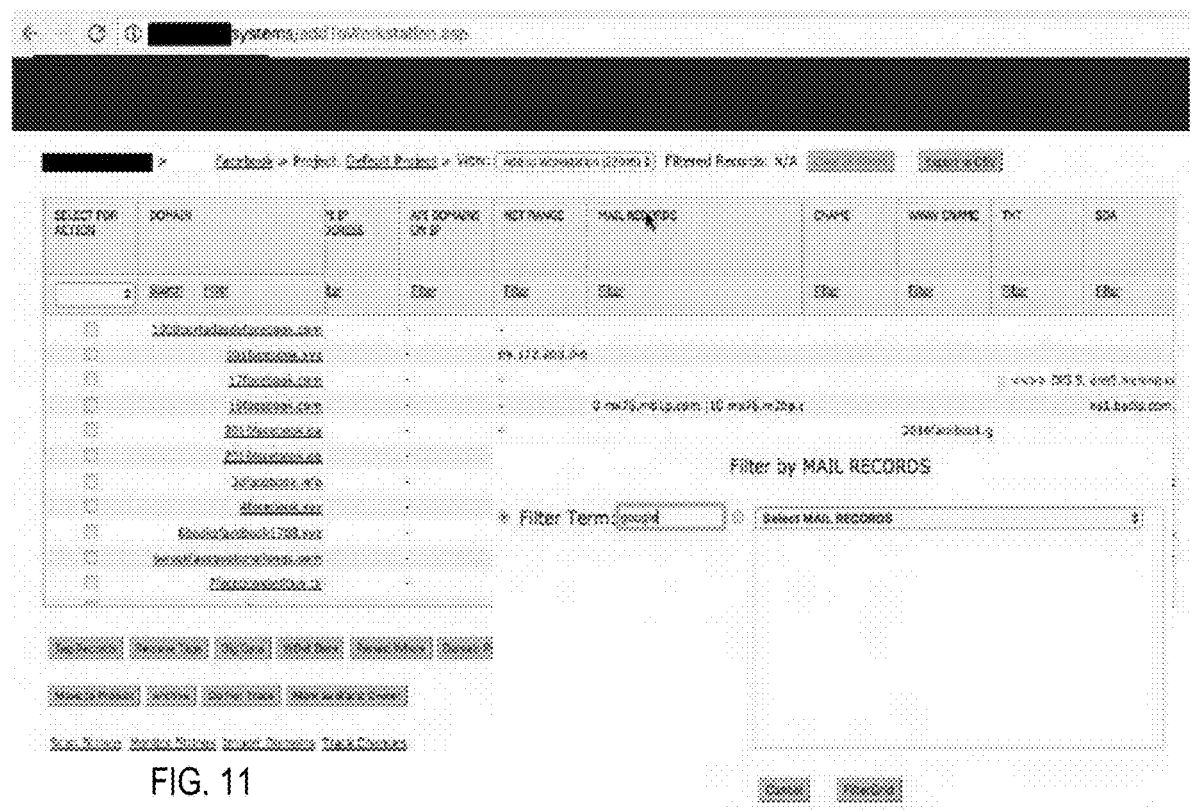
Figure 12:
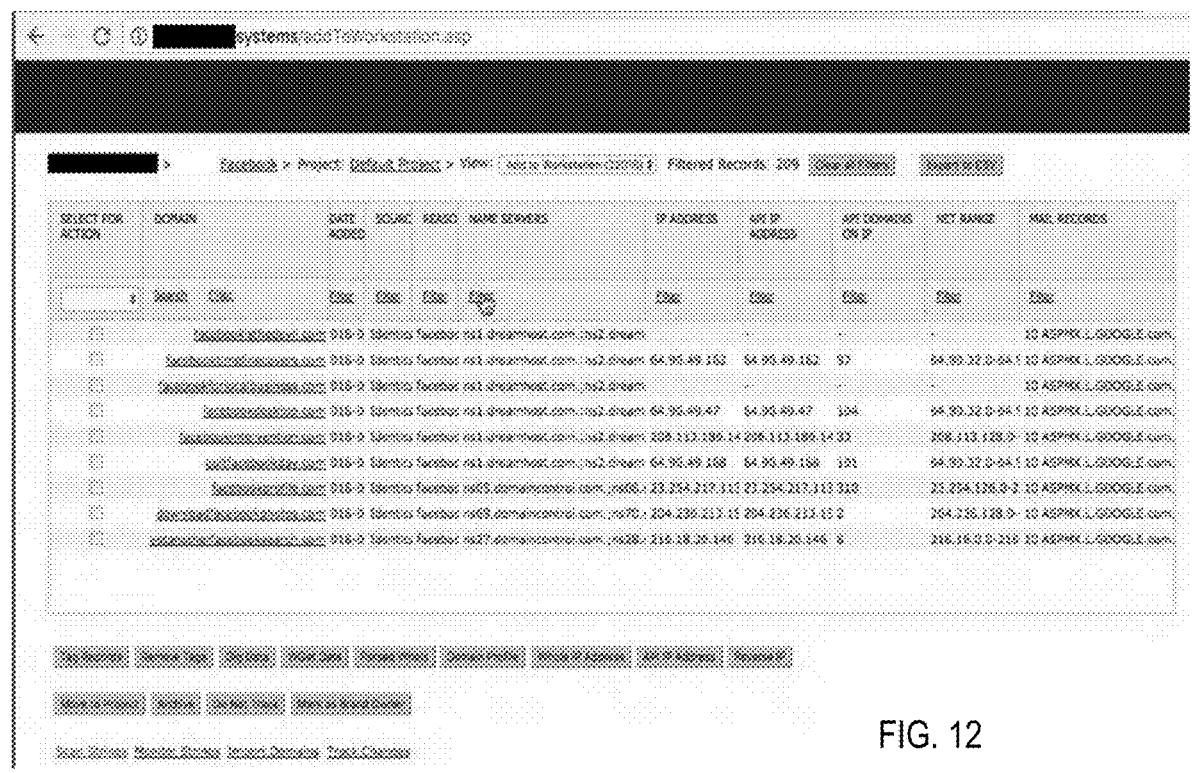

FIG. 10 illustrates a graphical interface displayed based on interaction with the graphical interface displayed in FIG. 9. After archiving data records based on filtering by name server, a user may interact with the graphical interface in FIG. 10 to further pivot on data records based on a data from another (e.g., a second) data source. In FIG. 10, the graphical interface may be interactive to provide input to filter on mail records in DNS data. For example, the graphical interface may be interactive to enable a user to specify a filter term for mail records of a mail server for a domain. Mail records may include mail exchanger (MX) records for a DNS. Each MX record may specify a mail server responsible for accepting email messages on behalf of a recipient's domain. FIG. 11 shows an example in which "Google" is specified as a filter term for pivoting based on mail records for a mail server for Google. By filtering on "Google," a user can first identify records based on a Google mail servers which are known to be verified. FIG. 12 illustrates the graphical interfaces from FIG. 10 which has been modified to display records based on filtering by "Google" for mail servers. By filtering based on mail records for "Google," the total number of records to assess can be reduced. For example, 22,016 records are reduced to 209 records. With a reduced set of records, a user can focus on a small set of records to look for malicious activity.

Figure 13:
Figure 14:
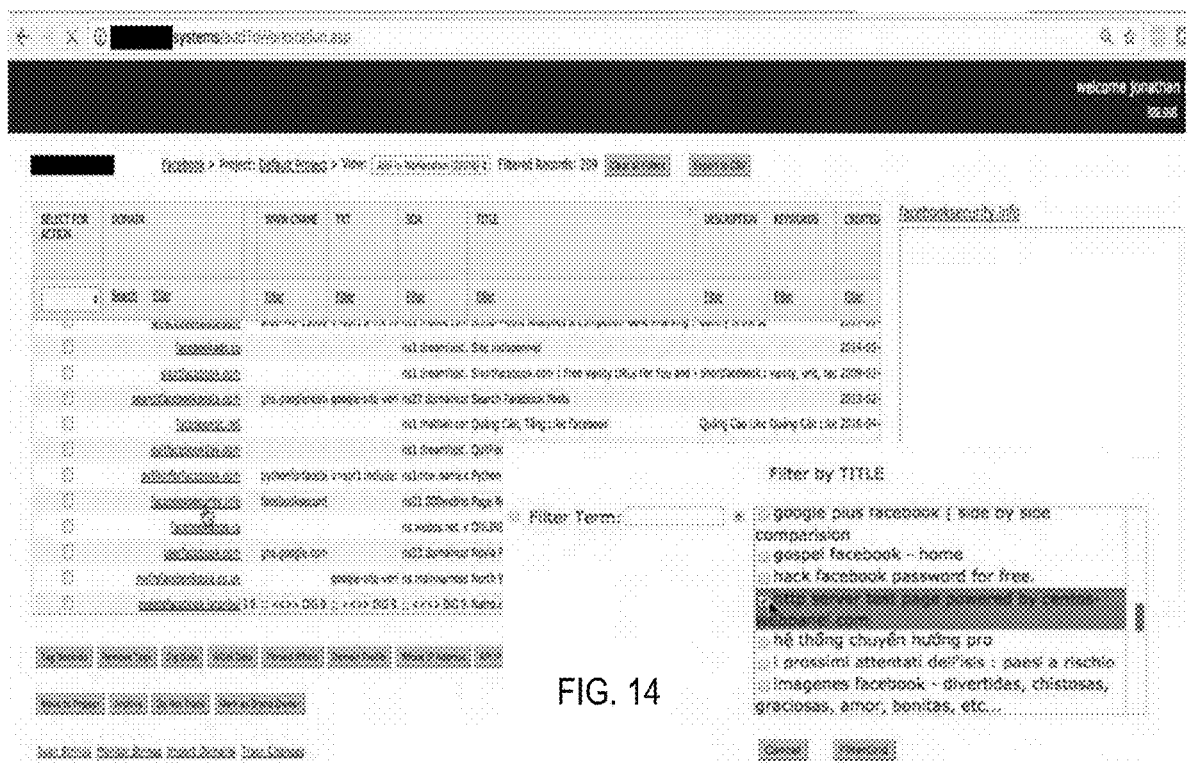

FIG. 13 illustrates a graphical interface that is displayed with the filtered records for "Google" mail servers. Using data in records for a different column (e.g., "Title"), a user is now able to identify domains which are under construction. Such domains may pose a security risk as not being legitimate as evidenced by a page under construction. The domain field in the records may be interactive to display the web page alongside the graphical interface to quickly confirm the existence or non-existence of the domain. The web page may be accessed from a different data source, such as web data including the content of the web page for a domain. In one example, "facebooksecurity.info" domain may be viewed in a graphical interface next to the graphical interface of the records. Viewing the domain may include accessing the web data based on the DNS data for the domain. The web data may be displayed next to the records. In this example, viewing the domain may show that the domain redirects to a different domain. Based on determining that the domain redirects based on a Google mail server set up for the Facebooksecurity.info domain, a user may further determine that the domain may be malicious. Based on this assessment, a user may utilize the graphical interface to pivot on another data source for zone data including zone file domain. Further inspection of the zone file domain indicates Facebook security either with an email domain that has capability for sending mail on Google mail servers that is not actually registered with Google and in a structure for sending email to that domain and it is redirecting to Facebook. Pivoting between multiple data sources may suggest a security threat based on improper use of Google mail servers and the Facebook domain. In a short period of time, a user has been able to reduce 22,000 records to a small set of records that are invested more heavily in mail servers with Google that are likely to be potentially used for broader spear phishing email campaigns. Such a threat can be verified by displaying the web data for a domain in the graphical interface displayed alongside the records. In some embodiments, the web title may be used to open a graphical interface that displays a redirect to a domain. FIG. 14 illustrates a graphical interface for filtering on another data source. For example, records in the graphical interface of FIG. 13 can be filtered by web data, such as a "title" of a web site, to remove domains that are irrelevant for consideration (e.g., domains under construction or welcome sites). Filtering the 209 records may be further reduced by filtering to less than 20 records. Now turning to FIG. 15, filtering based on mail records can be refined to ensure that the proper records are filtered by mail server, and not just by a name of the mail record including the name of a mail server. For example, records may be filtered for "Google" mail server, although not all mail server names include "Google."

Figure 15:
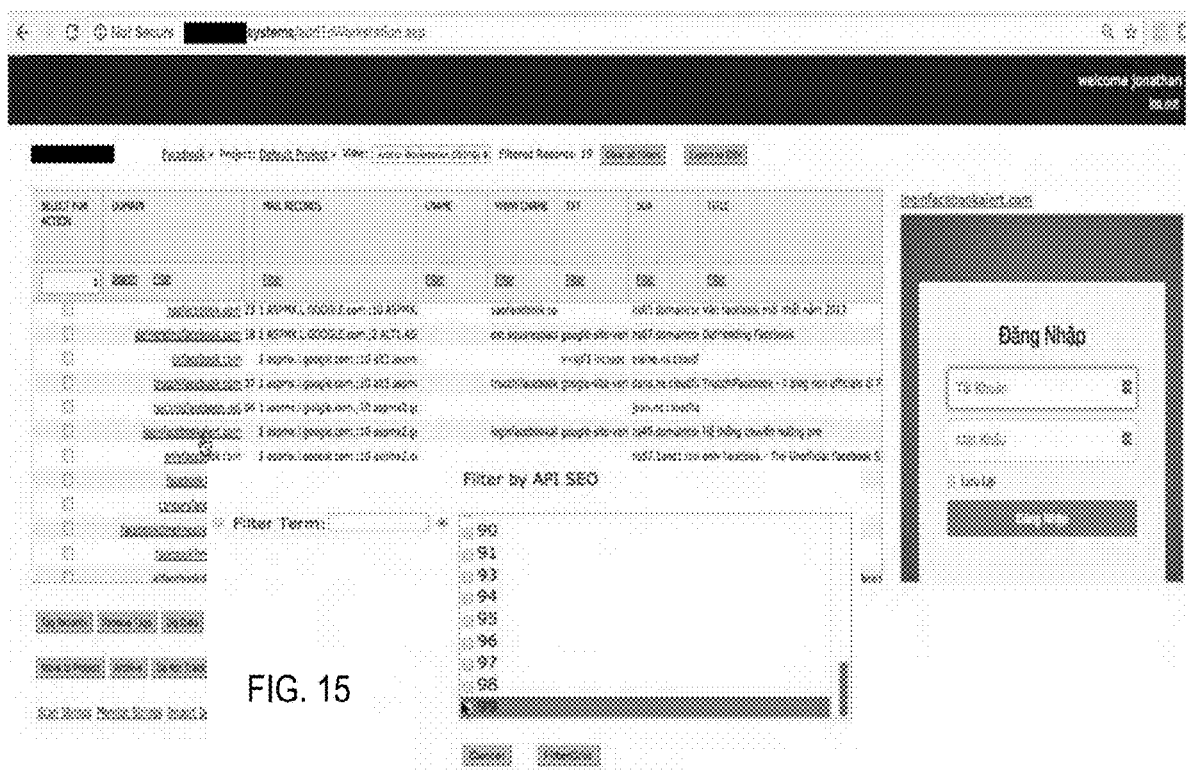
Figure 16:
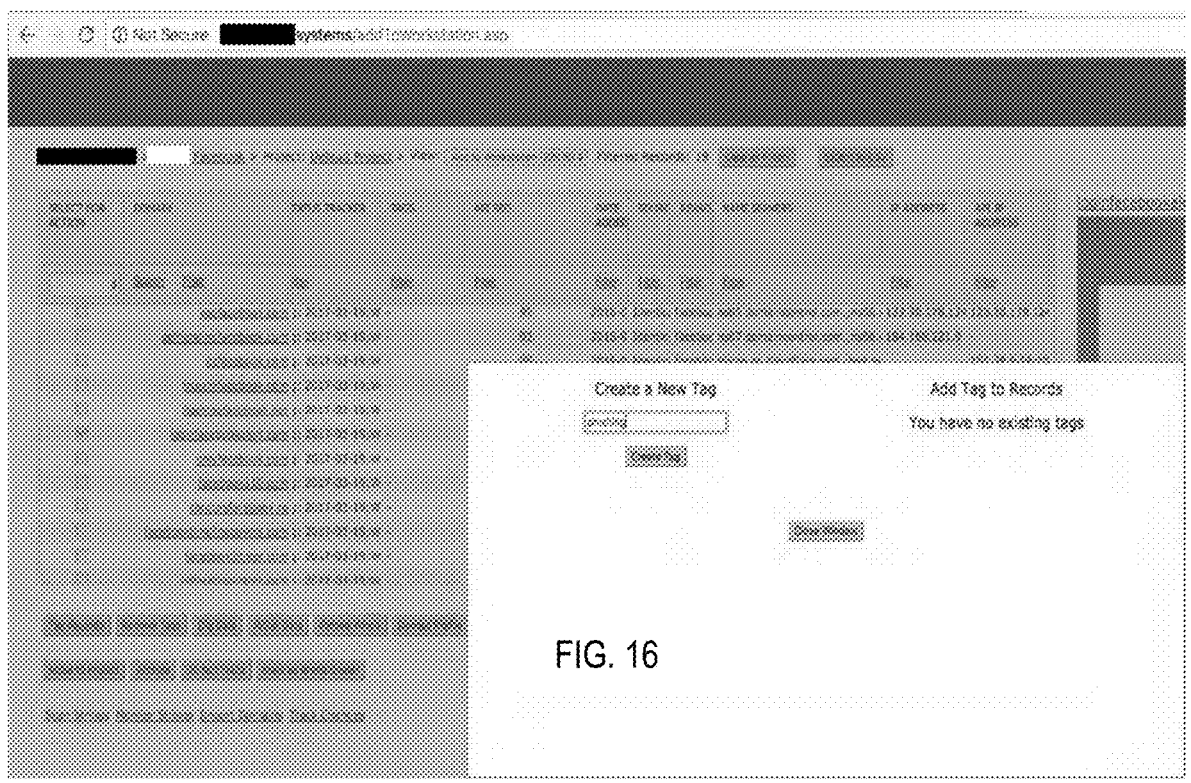

FIG. 15. illustrates filtering by another data set including API search engine optimization (SEO) data. Filtering the existing records based on API SEO can further enable records to be limited to those that may be used to malicious activity (e.g., phishing). In this example, "loginfacebookalert.com" may be a malicious domain because it has a high SEO score but appears to be a phishing page using a login page that looks confusingly similar to a login page of facebook.com. Therefore, by further filtering on another data set, the records may be further limited to a small set for analysis to detect anomalies in operation of domains. The graphical interface may be useable to tag or associate information quickly with domains that are identified as malicious after pivoting through multiple different data sets. FIG. 16 illustrates a graphical interface for creating custom data (e.g., a tag) to be associated with a record that is selected in the graphical interface of FIG. 15. The tagging may be used to selectively identify a few records for further analysis. The records which are tagged may be stored in a project for further analysis.

Figure 17:
Figure 18:

FIG. 17 illustrates a graphical interface of records filtered down to 185 from almost 22,000 records. Continuing from the example of FIG. 15, the graphical interface illustrates records shown before filtering based on API SEO. In FIG. 17 the graphical interface displays more columns of data records, such as information obtained from web zone and border gateway protocol (BGP) data. The information may include information about a country in which the BGP data may be originating from. The country may be used to further filter the data. In this manner, a user can pivot off where an ISP is located (e.g., outside the US) and the domain in the zone file to end up with records in a particular domain for a country. This may be useful to identify domains that may be operated illegally in another country as identified based on the country of registration of the domain. FIG. 18 illustrates how a user can further filter on registration data, such as a registrant country, which may be used to verify the location of a domain for malicious activity.

Figure 19:
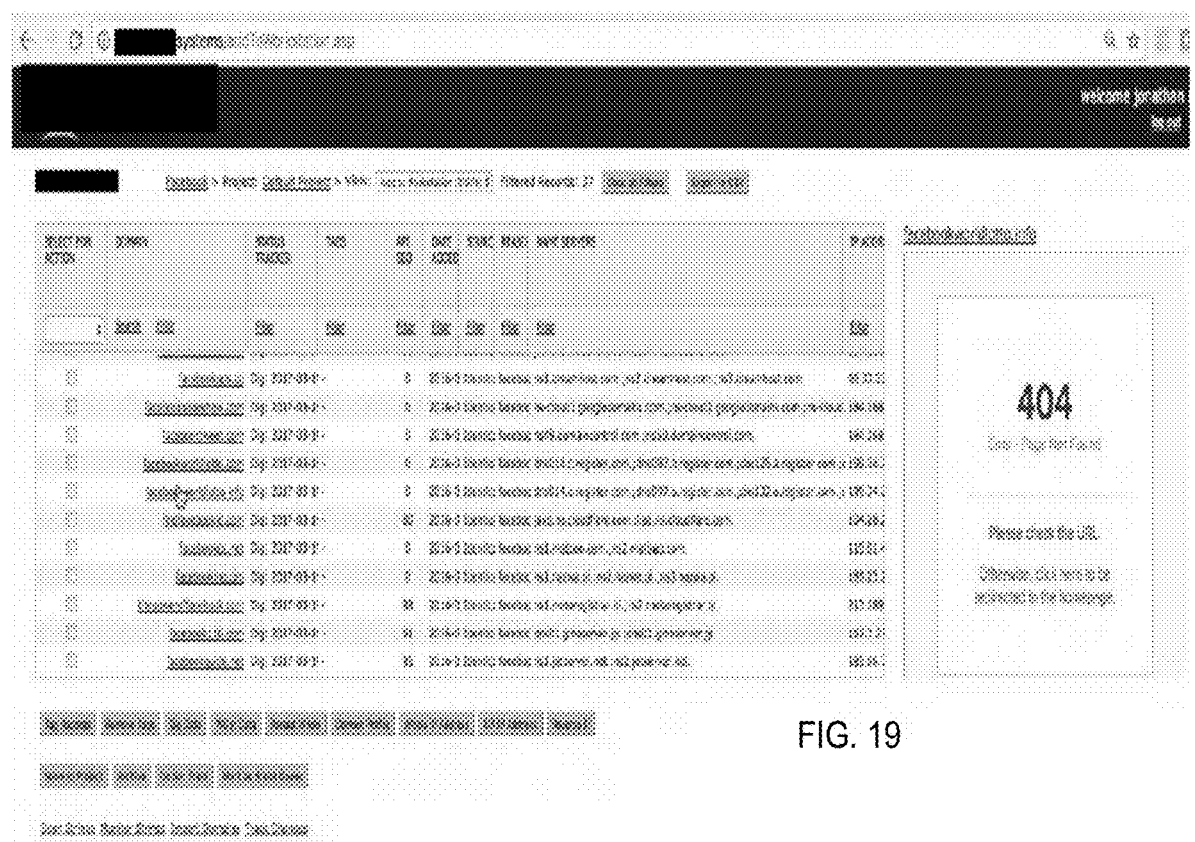

FIG. 19 illustrates how interaction with data for an attribute in a data record in the grid interface may cause a graphical interface to display alongside the grid interface web data about the domain. In this example, the graphical interface displays an error "404 Error—Page Not Found," which may be suggestive of a domain that may be a threat from fraudulent use. In this example, the web data for the domain may be displayed after pivoting on attributes such as mail server and registrant country. In some embodiments, data for other attributes related to the domain, such as data for MX records, may be pivoted to determine the use of domain, such as for other purposes such as emailing.

Figure 20:
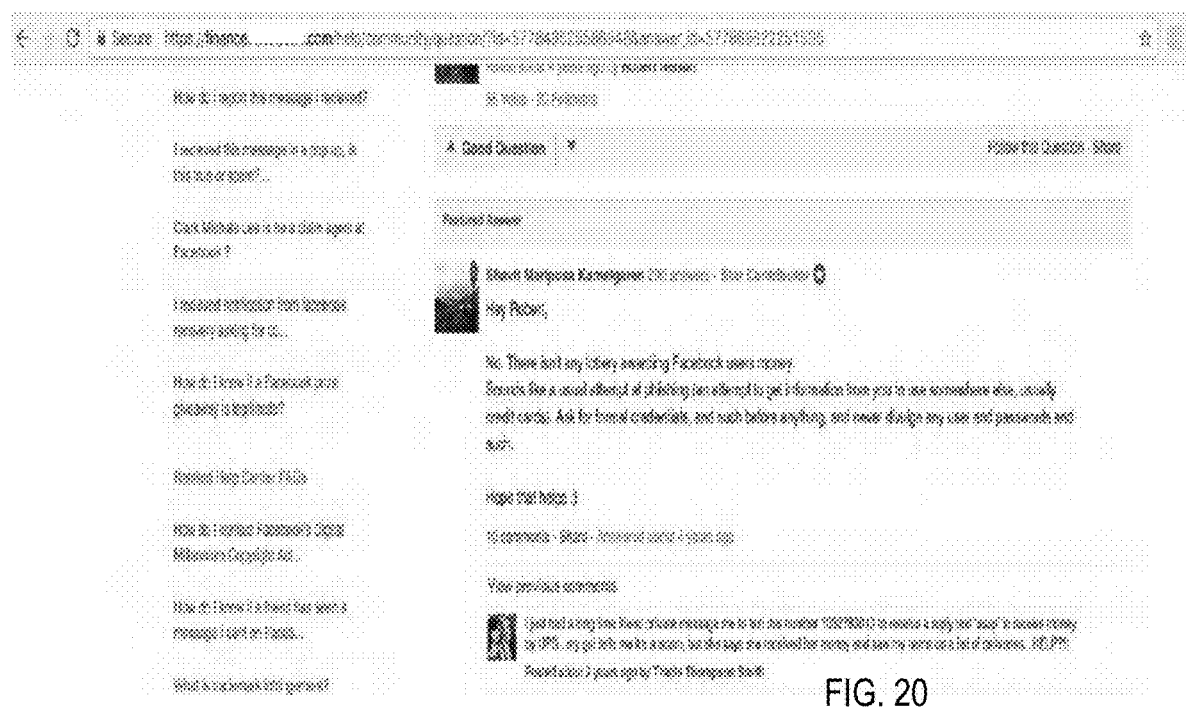
Figure 21:
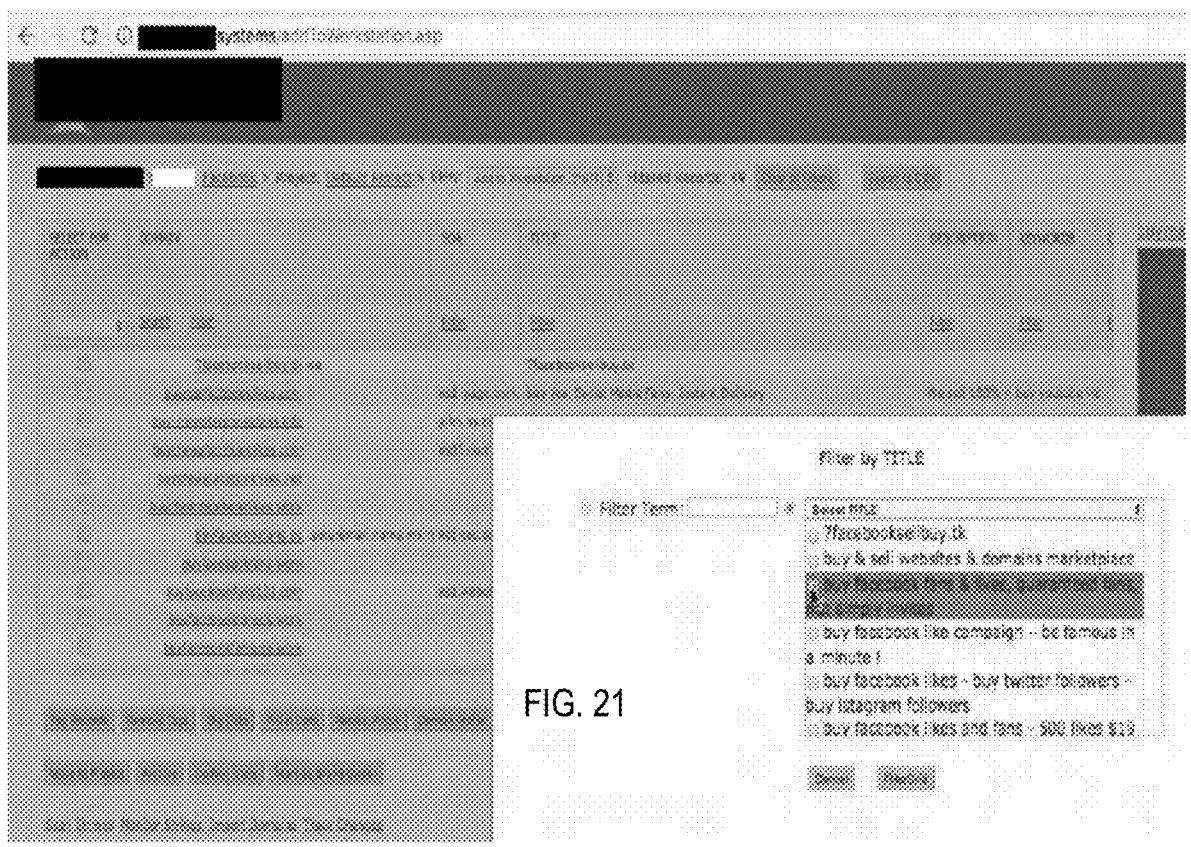
Figure 22:
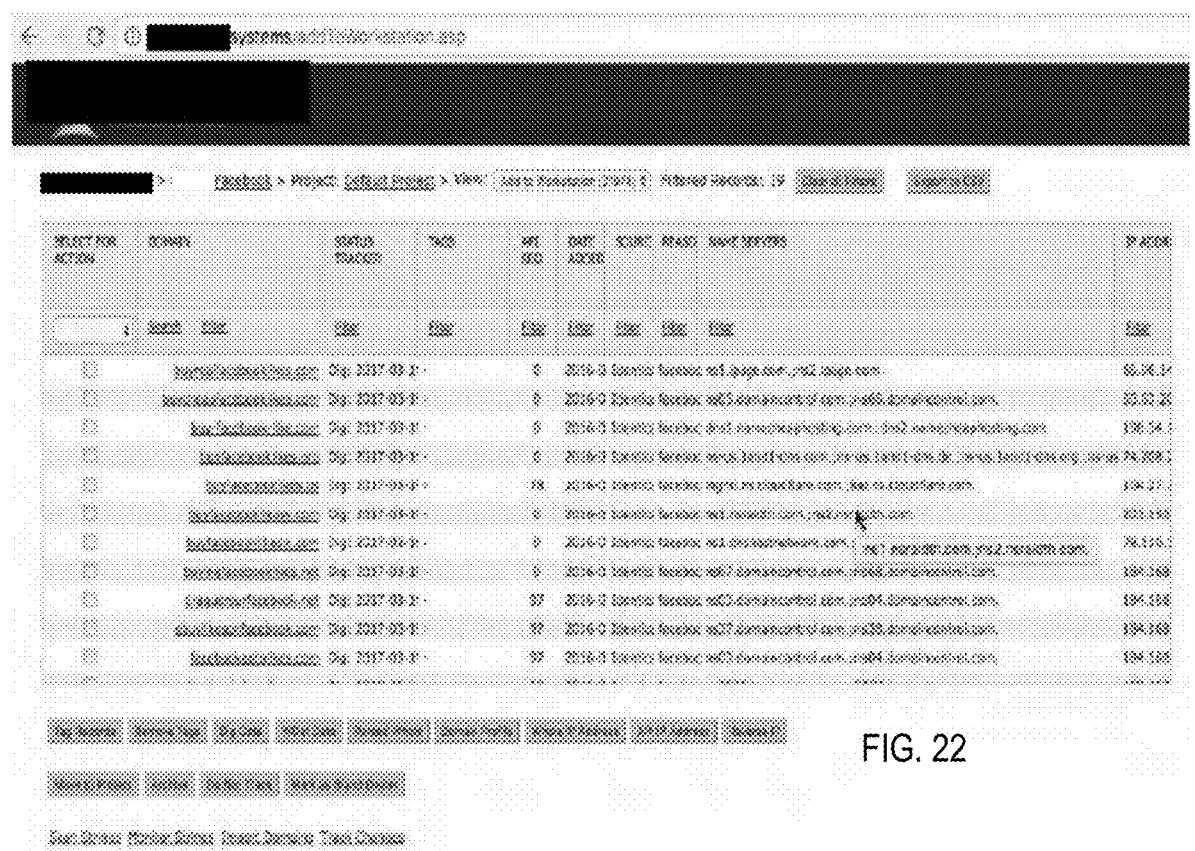
Figure 23:
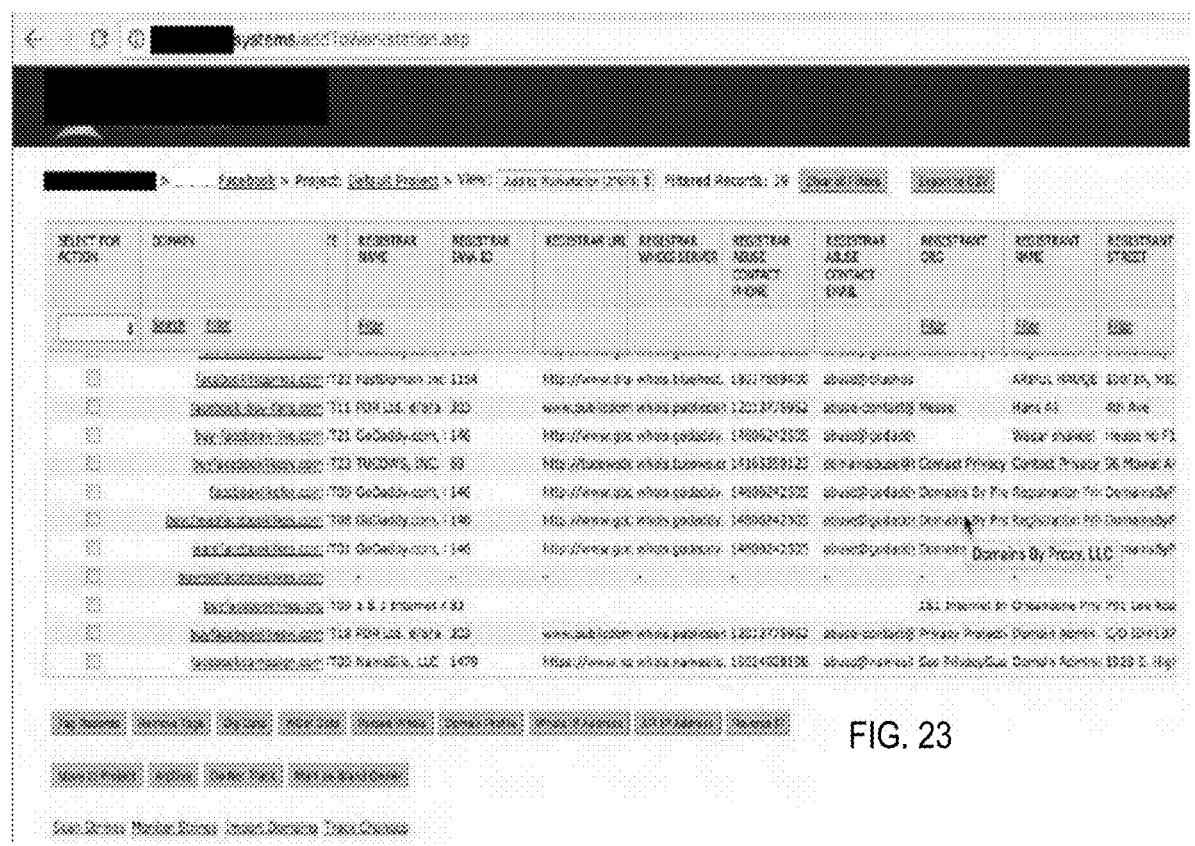
Figure 24:
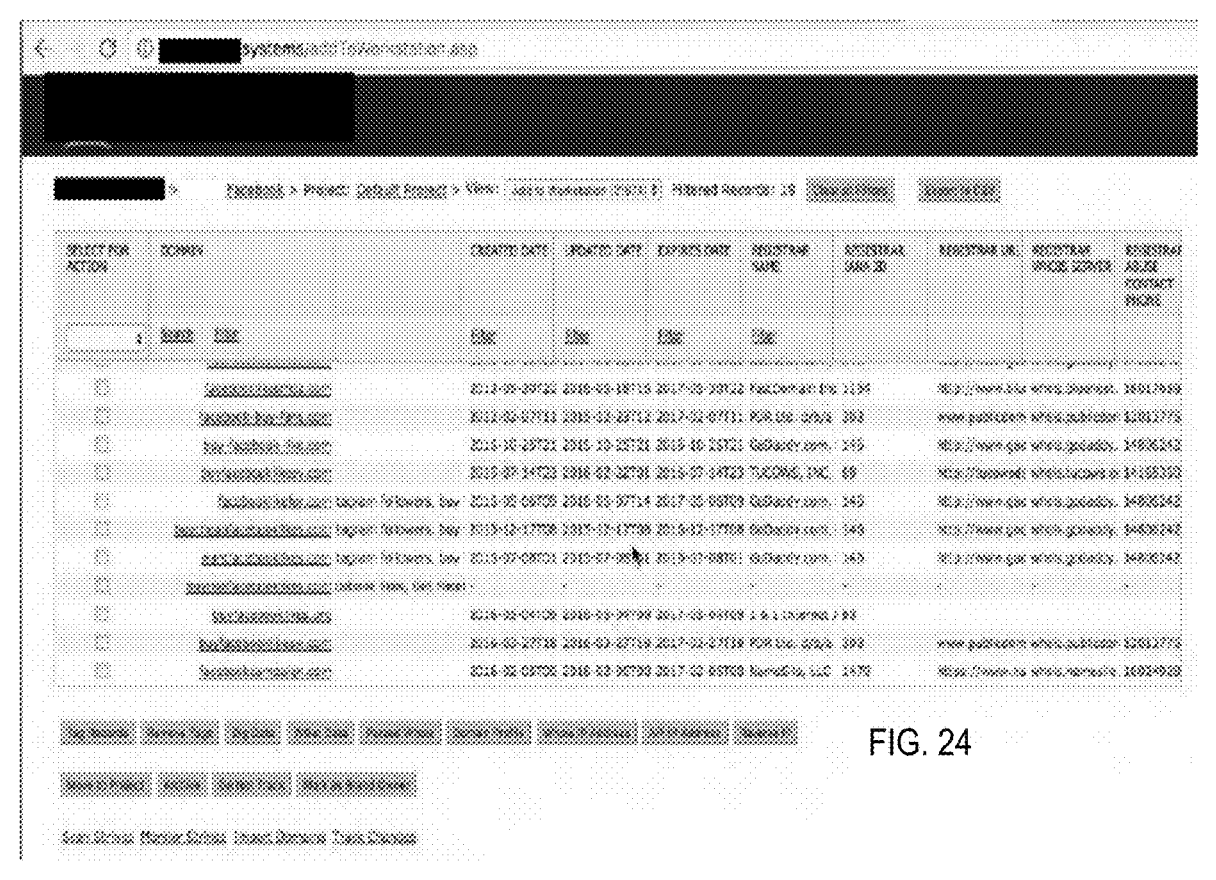
Figure 25:
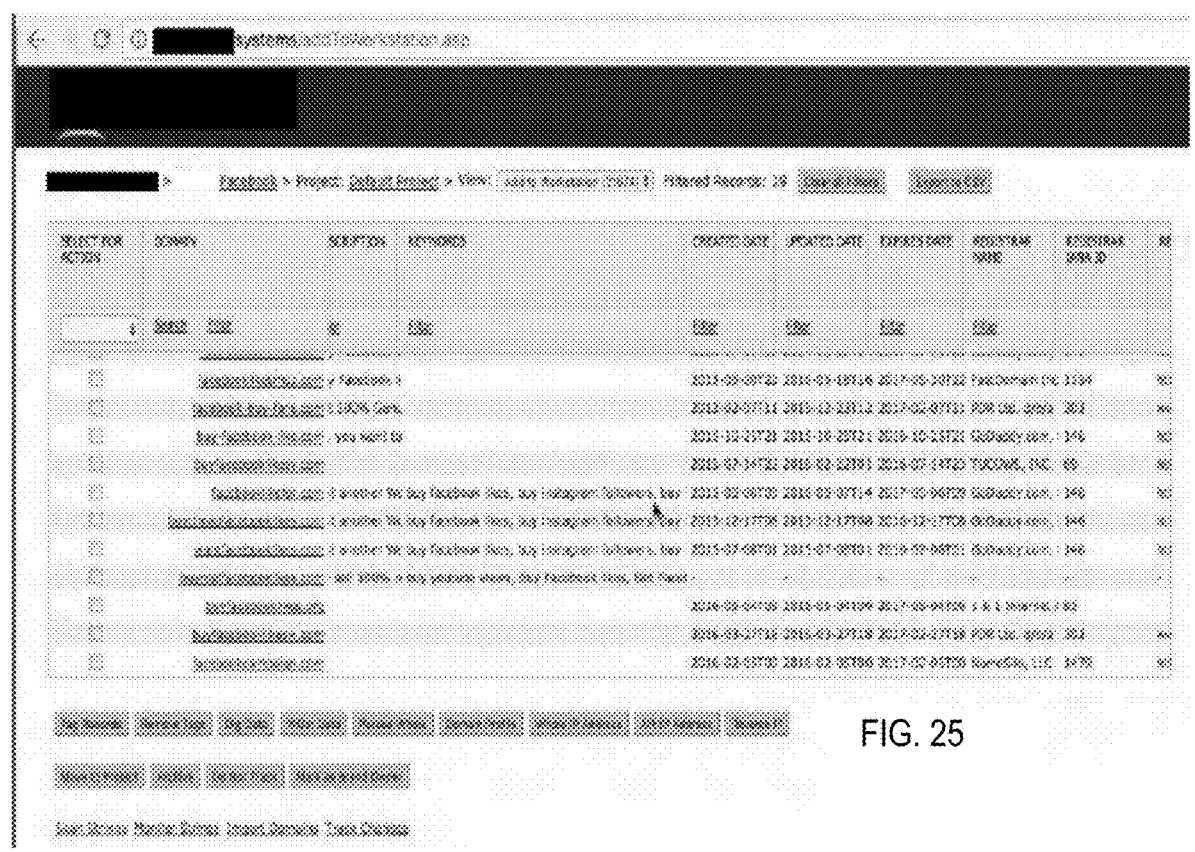

Now turning to FIG. 20, an example is shown of a website launched from a domain in a data record of FIG. 19. The web data may be used to launch the web page for the domain in a new interface. In FIG. 19, the filter functions may be used to search for other potential unauthorized uses of a domain such as for commerce (e.g., selling or buying). The filter may be used to search for "likes" or other terms associated with commerce. For example, in FIG. 21, input may be provided to filter on "title" for terms, such as "like." Such domains may be associated with unauthorized use of the name of an entity associated with other authorized network assets. FIG. 22 illustrates the graphical interface updated with data records identified based on the value for the attribute "title." By filtering on the attribute title, data records may be further reduced for consideration of those more likely to be suspicious. FIG. 23 shows pivoting off another attribute related to registration, such as registrant organization. The data records may be further filtered to show those data records registered with proxy services (e.g., "Domain by proxy"). A user would never know those domains were under common control unless pivoting on the data to discover the data records for which the registrant is a domain by proxy services. Now turning to FIG. 24, the data records may be filtered by "registrant name." Some of the domains may be registered differently, such that registration names are different. These data records on the basis of these attributes may provide further indication of a possible unauthorized use or registration for a domain. FIG.

Figure 26:
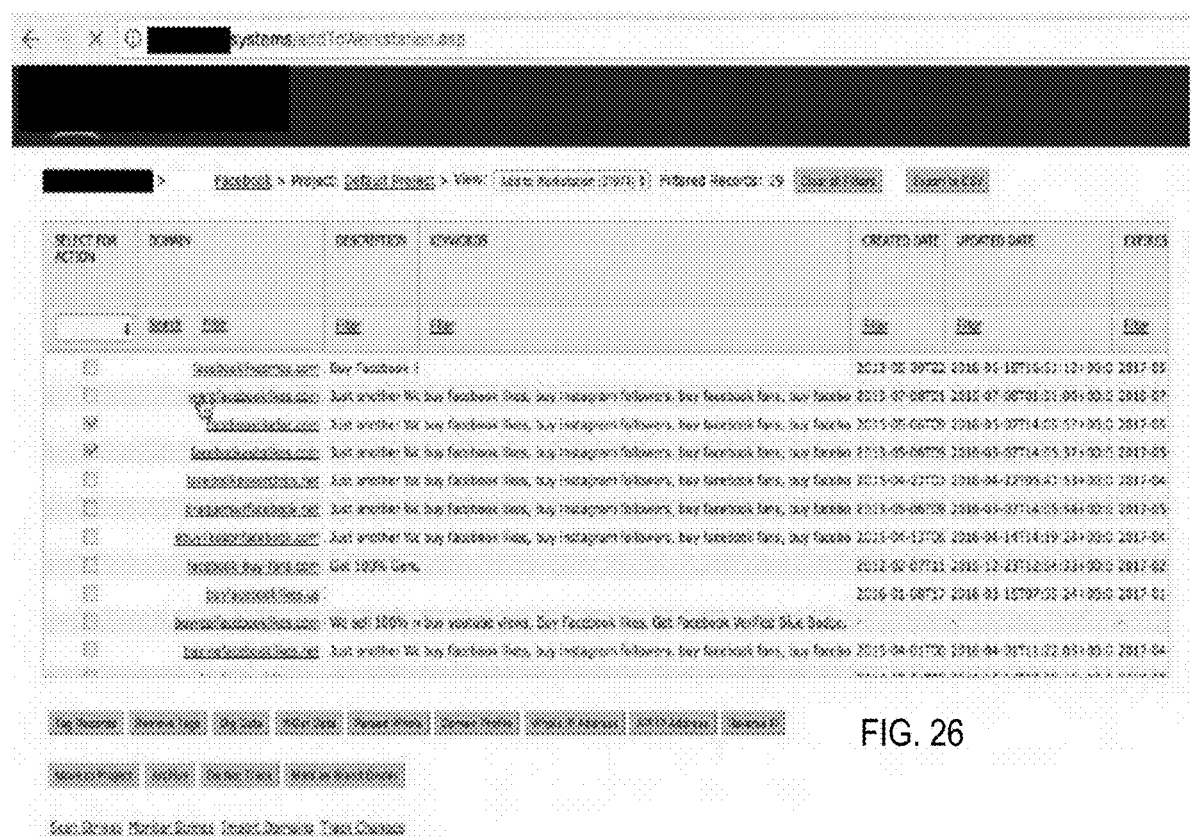
Figure 27:

25 shows another example of pivoting based on terms in the "keywords" attribute of web data in a data record. In this example, data records may be identified as promotional pages based on the keywords. Further analysis of the data records may result in identifying the domains as all promoting Facebook in the title, detecting domain by proxy, and then different creation dates. The use of similar titles and/or keywords may be useful to determine that the set of domains are all under common control and management. FIG. 26 shows an example in which data records for domains can be identified as possibly being under common control based on including the same keywords, although the creation date is different. FIG. 27 shows how the grid interface may be interactive to select data records for association as a group, e.g., a project for further analysis. The data records can be reduced to the grouped set for analysis of network assets that appear under common control and management.

Thus, although the disclosure has been described with respect to specific embodiments, it will be appreciated that the disclosure is intended to cover all modifications and equivalents within the scope of the following claims.

What is claimed is:

1. A method comprising:
   gathering a plurality of data sets from a plurality of data sources;
   receiving one or more criteria via a graphical interface, the one or more criteria used to filter the plurality of data sets into a plurality of data records;
   generating the graphical interface to display the plurality of data records;
   receiving, via the graphical interface, a first selection of a first attribute of the plurality of data records, wherein the first attribute comprises a name server attribute;
   generating the graphical interface to display a first filtered plurality of data records based on the first selection of the first attribute filtering the plurality of data records;
   receiving, via the graphical interface, a second selection of a second attribute of the first filtered plurality of data records;
   filtering the first filtered plurality of data records based on the second attribute to generate a second filtered plurality of data records;
   identifying, using the first attribute and the second attribute received via the graphical interface and one or more rules, one or more data records in the second filtered plurality of data records having a suspect relationship with one or more network assets of an entity previously identified as potentially malicious, wherein the one or more rules indicate the suspect relationship based on the first attribute and the second attribute; and
   causing the graphical interface to display the one or more data records with a visual appearance associated with the one or more network assets of the entity identified as potentially malicious based on the identified suspect relationship.

2. The method of claim 1, wherein the second attribute is a domain attribute.

3. The method of claim 1, wherein the one or more criteria include one or more of a descriptive tag, Internet Protocol address, application programming interface Internet Protocol address, source, date, and reason.

4. The method of claim 1, further comprising:
   receiving user input in the graphical interface, wherein the graphical interface includes a preview panel configured to display web content retrieved from a selected domain name responsive to the user input comprising a user selection of the selected domain name on the graphical interface; and
   displaying the retrieved web content from the selected domain name in the preview panel responsive to the user input.

5. The method of claim 1, wherein the graphical interface includes a filter dialog interface to receive one or more data values associated with the one or more criteria.

6. The method of claim 1, further comprising:
   receiving user input in the graphical interface, wherein the user input comprises custom data to tag a selected data record of the one or more data records with user-specified information associated with the one or more network assets of the entity.

7. A system comprising:
   a network analytic component, implemented at least partially by hardware, configured to:
   gather a plurality of data sets from a plurality of data sources;
   receive one or more criteria via a graphical interface, the one or more criteria used to filter the plurality of data sets into a plurality of data records;
   generate the graphical interface to display the plurality of data records;
   receive, via the graphical interface, a first selection of a first attribute of the plurality of data records, wherein the first attribute comprises a name server attribute;
   generate the graphical interface to display a first filtered plurality of data records based on the first selection of the first attribute filtering the plurality of data records;
   receive, via the graphical interface, a second selection of a second attribute of the first filtered plurality of data records;
   filter the first filtered plurality of data records based on the second attribute to generate a second filtered plurality of data records;
   identify, using the first attribute and the second attribute received via the graphical interface and one or more adjustable rules, one or more data records in the second filtered plurality of data records having a suspect relationship with one or more network assets of an entity previously identified as potentially malicious, wherein the one or more rules indicate the suspect relationship based on the first attribute and the second attribute; and
   cause the graphical interface to display the one or more data records with a visual appearance associated with the one or more network assets of the entity identified as potentially malicious based on the identified suspect relationship.

8. The system of claim 7, wherein the second attribute is a domain attribute.

9. The system of claim 7, wherein the one or more criteria include one or more of a descriptive tag, Internet Protocol address, application programming interface Internet Protocol address, source, date, and reason.

10. The system of claim 7, wherein the network analytic component, implemented at least partially by hardware, is further configured to:
    receive user input in the graphical interface, wherein the graphical interface includes a preview panel configured to display web content retrieved from a selected domain name responsive to the user input comprising a user selection of the selected domain name on the graphical interface; and display the retrieved web content from the selected domain name in the preview panel responsive to the user input.

11. The system of claim 7, wherein the graphical interface includes a filter dialog interface to receive one or more data values associated with the one or more criteria.

12. The system of claim 7, wherein the network analytic component, implemented at least partially by hardware, is further configured to:

receive user input in the graphical interface, wherein the user input comprises custom data to tag a selected data record of the one or more data records with user-specified information associated with the one or more network assets of the entity.

13. One or more non-transitory computer-readable media storing instructions that, when executed by one or more computing devices, cause:

gathering a plurality of data sets from a plurality of data sources;

receiving one or more criteria via a graphical interface, the one or more criteria used to filter the plurality of data sets into a plurality of data records;

generating the graphical interface to display the plurality of data records;

receiving, via the graphical interface, a first selection of a first attribute of the plurality of data records, wherein the first attribute comprises a name server attribute;

generating the graphical interface to display a first filtered plurality of data records based on the first selection of the first attribute filtering the plurality of data records;

receiving, via the graphical interface, a second selection of a second attribute of the first filtered plurality of data records;

filtering the first filtered plurality of data records based on the second attribute to generate a second filtered plurality of data records;

identifying, using the first attribute and the second attribute received via the graphical interface and one or more adjustable rules, one or more data records in the second filtered plurality of data records having a suspect relationship with one or more network assets of an entity previously identified as potentially malicious, wherein the one or more rules indicate the suspect relationship based on the first attribute and the second attribute; and causing the graphical interface to display the one or more data records with a visual appearance associated with the one or more network assets of the entity identified as potentially malicious based on the identified suspect relationship.

14. The one or more non-transitory computer-readable media of claim 13, wherein the second attribute is a domain attribute.

15. The one or more non-transitory computer-readable media of claim 13, wherein the one or more criteria include one or more of a descriptive tag, Internet Protocol address, application programming interface Internet Protocol address, source, date, and reason.

16. The one or more non-transitory computer-readable media of claim 13, wherein the instructions that, when executed by one or more computing devices, further cause:

receiving user input in the graphical interface, wherein the graphical interface includes a preview panel configured to display web content retrieved from a selected domain name responsive to the user input comprising a user selection of the selected domain name on the graphical interface; and displaying the retrieved web content from the selected domain name in the preview panel responsive to the user input.

17. The one or more non-transitory computer-readable media of claim 13, wherein the graphical interface includes a filter dialog interface to receive one or more data values associated with the one or more criteria.

18. The one or more non-transitory computer-readable media of claim 13, wherein the instructions that, when executed by one or more computing devices, further cause:

receiving user input in the graphical interface, wherein the user input comprises custom data to tag a selected data record of the one or more data records with user-specified information associated with the one or more network assets of the entity.

\* \* \* \* \*